US006205223B1

(12) United States Patent
Rao et al.

(10) Patent No.: US 6,205,223 B1
(45) Date of Patent: Mar. 20, 2001

(54) INPUT DATA FORMAT AUTODETECTION SYSTEMS AND METHODS

(75) Inventors: Raghunath Rao; Miroslav Dokic, both of Austin, TX (US)

(73) Assignee: Cirrus Logic, Inc.

(*) Notice: Subject to any disclaimer, the term of this patent is extended or adjusted under 35 U.S.C. 154(b) by 0 days.

(21) Appl. No.: 09/042,288

(22) Filed: Mar. 13, 1998

(51) Int. Cl.[7] .................................................. H04L 9/00

(52) U.S. Cl. .............................. 380/42; 713/160; 703/27; 341/51

(58) Field of Search .............................. 713/160; 380/42; 395/500; 341/51; 703/27; 382/233

(56) References Cited

U.S. PATENT DOCUMENTS

| | | | | |
|---|---|---|---|---|
| 4,377,859 | * | 3/1983 | Dunning et al. | 370/376 |
| 5,222,081 | * | 6/1993 | Lewis et al. | 375/117 |
| 5,374,916 | * | 12/1994 | Chu | 340/146.2 |
| 5,467,087 | * | 11/1995 | Chu | 341/51 |
| 5,491,771 | * | 2/1996 | Gupta et al. | 395/2.32 |
| 5,499,293 | * | 3/1996 | Behram et al. | 705/76 |
| 5,553,271 | * | 9/1996 | Hile et al. | 395/500 |
| 5,594,660 | * | 1/1997 | Sung et al. | 364/514 |
| 5,784,544 | * | 7/1998 | Stevens | 395/112 |
| 5,832,120 | * | 11/1998 | Prabhakar et al. | 382/233 |

* cited by examiner

*Primary Examiner*—Tod R. Swann
*Assistant Examiner*—Steve Kabakoff
(74) *Attorney, Agent, or Firm*—James J. Murphy; Peter Rutkowski

(57) ABSTRACT

A method of automatically detecting a data format type of a stream of data. A determination is made as to whether a current word and a previously received words comprise a set of identifiers associated with a selected type of data. When a preselected number of detections of the set of identifiers has been reached within a predefined time period, the input stream is declared to be the selected type of data. Simultaneously, when the selected type of data is not detected, other data types are sequentially selected for similar checking. This successive selection of different data types allows the method to classify the input data into one out of multiple data types.

41 Claims, 17 Drawing Sheets

INPUT DATA FORMAT AUTODETECTION SYSTEMS AND METHODS

CROSS-REFERENCE TO RELATED APPLICATION

The following co-pending and co-assigned applications contain related information and are hereby incorporated by reference:

Ser. No. 08/970,979 (Attorney Docket No. 0680-CY-US), entitled "DIGITAL AUDIO DECODING CIRCUITRY, METHODS AND SYSTEMS", filed Nov. 14, 1997 currently pending;

Ser. No. 08/970,794 (Attorney Docket Nu. 0800-CS), entitled "METHODS FOR BOOTING A MULTIPROCESSOR SYSTEM", filed Nov. 14, 1997 and granted Jan. 4, 2000 as U.S. Pat. No. 6,012,142;

Ser. No. 08/969,893 (Attorney Docket No. 0802-CS), entitled "INTER-PROCESSOR COMMUNICATION CIRCUITRY AND METHODS", filed Nov. 14, 1997 currently pending;

Ser. No. 08/969,884 (Attorney Docket No. 0803-CS), entitled "METHODS FOR UTILIZING SHARED MEMORY IN A MULTIPROCESSOR SYSTEM", filed Nov. 14, 1997 currently pending;

Ser. No. 09/483,290 (Attorney Docket No. 0803-CS-D1) entitled "METHODS FOR PROCESSING AUDIO INFORMATION IN A MULTIPROCESSOR AUDIO DECODER" divisional application filed Jan. 14, 1999 and currently pending;

Ser. No. 08/970,796 (Attorney Docket No. 0804-CS), entitled "ZERO DETECTION CIRCUITRY AND METHODS", filed Nov. 14, 1997 and granted Nov. 2, 1999 as U.S. Pat. No. 5,978,825;

Ser. No. 08/970,841 (Attorney Docket No. 0805-CS), entitled "BIAS CURRENT CALIBRATION OF VOLTAGE CONTROLLED OSCILLATOR", filed Nov. 14, 1997 and granted May 25, 1999 as U.S. Pat. No. 5,907,263;

Ser. No. 08/971,080 (Attorney Docket No. 0806-CS), entitled "DUAL PROCESSOR AUDIO DECODER AND METHODS WITH SUSTAINED DATA PIPELINING DURING ERROR CONDITIONS", filed Nov. 14, 1997 and granted Dec. 28, 1999 as U.S. Pat. No. 6,009,389;

Ser. No. 08/970,302 (Attorney Docket No. 0807-CS), entitled "METHODS FOR EXPONENT PROCESSING IN AN AUDIO DECODING SYSTEM", filed Nov. 14, 1997 and granted Sep. 28, 1999 as U.S. Pat. No. 5,960,401; and Ser. No. 08/970,372 (Attorney Docket No. 0801-CS), entitled METHOD FOR DEBUGING A MULTIPROCESSOR SYSTEM, filed Nov. 14, 1997 currently pending.

BACKGROUND OF THE INVENTION

1. Field of the Invention

The present invention relates in general to data processing and in particular, to digital decoding circuitry and methods and systems using the same.

2. Description of the Related Art

The ability to process digitized audio information has become increasingly important in both the home theater and personal computer (PC) environments. In the home theater environment, high quality sound which fills the room is a key advantage of digital audio. Digital receivers, compact disc players, laser disc players, VCRs and televisions are a few of the sucessful applications of the digital audio technology. This technology continues to progress, and as it does, its applications are becoming increasingly sophisticated as improvements in sound quality and sound effects are sought.

A similar situation is true in the PC environment. Among other things, digital audio is a significant element of many PC-based multimedia audio applications, such as gaming and telecommunications. Audio functionality is therefore typically available on most conventional PCs, either in the form of an add-on audio board or as a standard feature provided on the motherboard itself. In fact, PC users increasingly expect not only audio functionality but high quality sound capability from their system.

One of the key components in many digital audio information processing systems is the decoder. Generally, the decoder receives digital data in a compressed form and converts that data into a decompressed digital form. The decompressed digital data is then passed on for further processing, such as filtering, expansion or mixing, conversion into analog form, and eventually conversion into audible tones. In other words the decoder provides the proper hardware and software interfaces to process the possible compressed (and decompressed) data sources, to feed the destination digital and/or analog audio devices. In addition, the decoder must have the proper interfaces required for overall control and debugging by a host microprocessor or microcontroller.

Since, there are a number of different audio compression/decompression schemes such as Dolby AC3 and DTS, and interface definitions, such as S/PDIF (Sony/Phillips Digital Interface), a state of the art digital audio decoder should be capable of supporting multiple compression/decompression formats. Such a decoder should also perform additional functions appropriate to the decoder subsystem of a digital audio system, such as the mixing of various received digital and/or audio data streams. Notwithstanding these issues, it is essential that such a decoder handle the data throughput transparently with efficiency, speed and robustness. Thus, the need has arisen for an digital audio decoder which provides maximum utility and flexibility in view of the array of different formats and interfaces.

SUMMARY OF THE INVENTION

Disclosed is a method according to the present inventive teachings of automatically detecting a data format type of a stream of audio data. A determination is made as to whether a current word and a previously received word comprise a set of identifiers associated with a selected type of data. When a set of such identifiers is detected, a determination is made as to whether a preselected number of detections of the set of identifiers has been reached. If the preselected number of detections of the set of identifiers has been reached, a jump is made to a routine for processing the selected type of data. If the preselected number of detections has not been reached, testing for a second type of data and when the stored words are not identifiers of the first type of data, testing for the second type of data.

The teachings of the present invention overcome a number of problems which occur with prior art audio technologies. Among other things, these teachings allow for the automatic identification of the format of an incoming data stream on startup such that the given processing device or devices can appropriately process that data. Additionally, an automatic stream format detection can be made during runtime such that a change from one format to another can be addressed efficiently and robustly.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIG. 1–31 of the drawings, in which like numbers designate like parts.

Figure 1A:
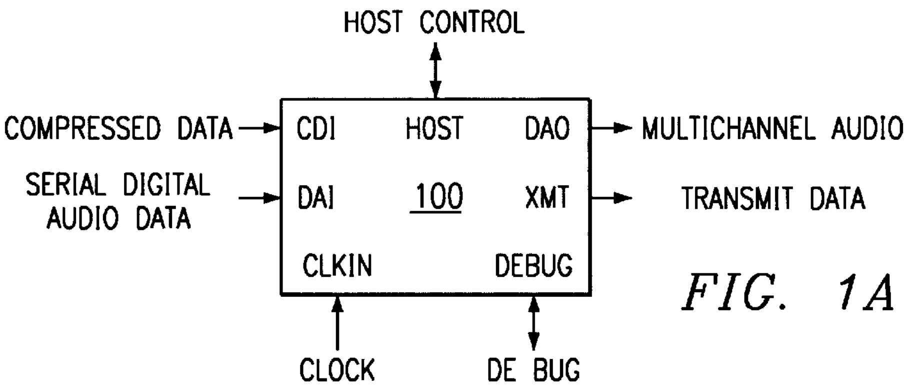
FIG. 1A is a diagram of a multichannel audio decoder embodying the principles of the present invention.

FIG. 1A is a general overview of an audio information decoder 100 embodying the principles of the present invention.

For a detailed description of decoder 100, please refer to U.S. patent application Ser. No. 08/970,979 (Attorney Docket No. 0680-CY-US[2836-P58US]), entitled "DIGITAL AUDIO DECODING CIRCUITRY, METHODS AND SYSTEMS", filed Nov. 14, 1997;

Decoder 100 is operable to receive data in any one of a number of formats, including compressed data conforming to the AC-3 digital audio compression standard, (as defined by the United States Advanced Television System Committee) through a compressed data input port CDI. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through a transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

With the advent of digital audio in various formats —such as Dolby Digital (AC3), DTS, MPEG and conventional Linear PCM - digital audio systems, such as receivers, must be designed to decode and process audio inputs in multiple formats. To be competitive in the marketplace, it is increasingly important for a receiver system to handle changes in input data efficiently, robustly, and in an user friendly manner.

IEC61937, a newer data interface format, is used as a means for exchanging compressed data along with information about the data itself. This is done by embedding a standard header, including a sync pattern, content description, size information and a single frame (smallest independently decodable unit) of compressed audio. The compressed data could in turn be any one of the various formats in use, including AC3, DTS, MPEG, etc.

Older formats, such as Linear PCM and elementary DTS compressed data on Laser Discs (LDs) and Compact Discs (CDs), do not contain embedded content description information. Therefore, if elementary DTS is used on the Linear PCM tracks on a LD or CD, a conventional LD/CD player will output this audio unsuspectingly as Linear PCM. In this case, where DTS data is being used in a PCM system, the user is expected to connect the player output through a DTS decoder to the receiver. If not, one would hear the compressed audio on the speakers directly, which is very harsh sounding and potentially dangerous to the system and the user.

At the receiving end, there are at least two ways in which the input data stream being processed can change content, which can cause similar problems. In a receiver environment, multiple inputs are often accepted in the form of multiple hardwired connections—DVD, LD, CD, VCR, Aux, etc. Then, when the user selects one of these inputs using the front panel buttons a microcontroller within the receiver switches in the appropriate input. Whenever the user switches in a new input source, a change in input data format is always possible.

The input data format could also change if the user switches discs on the source player without changing the button selection on the front of the receiver. The microcontroller is again unaware of the stream change in this case.

While both the above kinds of input changes are possible, the majority of the cases fall in the first category, i.e. user pressing a button on the front panel. Although, the host processor cannot immediately detect the new input format, it can detect potential input change from the button pressing. This information is passed on to the decoder 100 to be used to trigger an autodetection mechanism. The decoder 100 analyzes the (new) bitstream and if possible processes it to produce audio. If not, it informs the host of the detected bitstream content and while continuing to monitor the input, waits for the host to download appropriate application code so that it can process this bitstream and generate audio.

In order to cover the case, where an input change is made unknown to the host, decoder 100 also incorporates a runtime autodetection scheme. While processing the input data and generating audio output, decoder simultaneously monitors the input bitstream for any change in content. If it detects any change, it automatically reverts to the autodetect state (as though the host had indicated an input change). In this fashion, the second case—that of the user switching source material unknown to the host —is also covered.

Figure 1B:
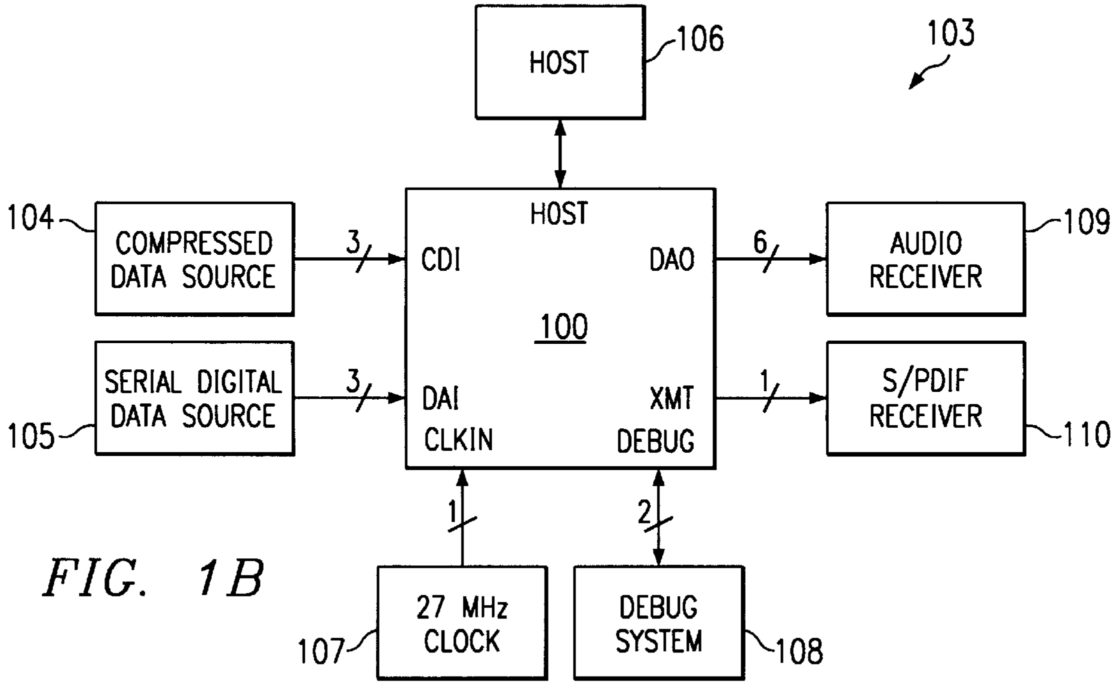
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of a compressed serial digital audio source 105, and in particular of AC-3 and DTS compressed digital sources, are digital video disc and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to an S/PDIF receiver 110. These outputs may be coupled, for example, to digital to analog converters or codecs for transmission to analog receiver circuitry.

Figure 1C:
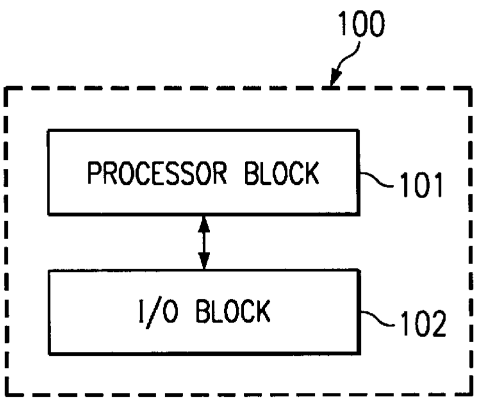
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and the I/O Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
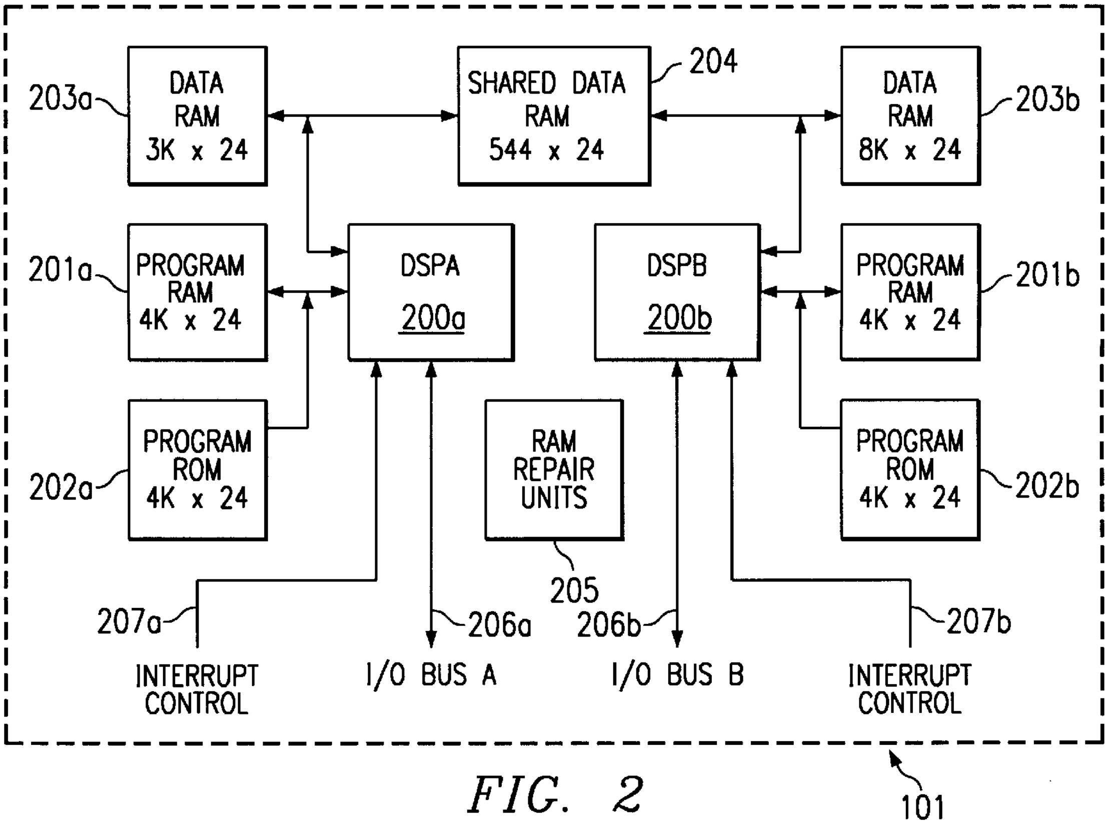
FIG. 2 is a diagram of the processor block of FIG. 1C.

FIG. 2 is a detailed functional block diagram of processor block 101. Processor block 101 includes two DSP cores 200*a* and 200*b*, labeled DSPA and DSPB respectively. Cores 200*a* and 200*b* operate in conjunction with respective dedicated program RAM 201*a* and 201*b*, program ROM 202*a* and 202*b*, and data RAM 203*a* and 203*b*. Shared data RAM 204, which the DSPs 200*a* and 200*b* can both access, provides for the exchange of data, such as PCM data and processing coefficients, between processors 200*a* or 200*b*. Processor block 101 also contains a RAM repair unit 205 that can repair a predetermined number of RAM locations within the on-chip RAM arrays to increase die yield.

DSP cores 200*a* and 200*b* respectively communicate with the peripherals through I/O Block 102 via their respective I/O buses 206*a*, 206*b*. The peripherals send interrupt and flag information back to the processor block via interrupt interfaces 207*a*, 207*b*.

DSP cores 200*a* and 200*b* are each based upon a time-multiplexed dual-bus architecture. As shown in FIG. 2, DSPs 200*a* and 200*b* are each associated with program and data RAM blocks 202 and 203. Data Memory 203 typically contains buffered audio data and intermediate processing results. Program Memory 201/202 (referring to Program RAM 201 and Program ROM 202 collectively) contains the program running at a particular time. Program Memory 201/202 is also typically used to store filter coefficients, as required by the respective DSP 200*a* or 200*b* during processing.

DSP cores 200*a* and 200*b* also respectively include a Data Address unit 301 for generating addresses to data memory 203, Program Address unit 301 for generating addresses to Program Memory 201/202, Execution Unit 303 which includes the circuitry required to perform arithmetic and logic operations on data received from either data memory or program memory, and buses 305 and 306 for carrying instructions to data to support DSP operations.

Buses 305 and 306 are respectively referred to as the source A/destination bus (Bus_A) and the source B/instruction bus (Bus_B). Bus_A 306 connects to data memory 203, data address unit (DAU) 303, the A input of execution unit (EU) 303, and I/O registers 300. Bus_B connects to program memory 201/202, program address unit (PAU) 302, DAU 301, and the B input to Execution Unit (EU) 303.

I/O registers 300 discussed in further detail below, provide for direct register control of respective DSP 200*a* and 200*b* from an external device, such as Host 106 (FIG. 1B).

Figure 4:
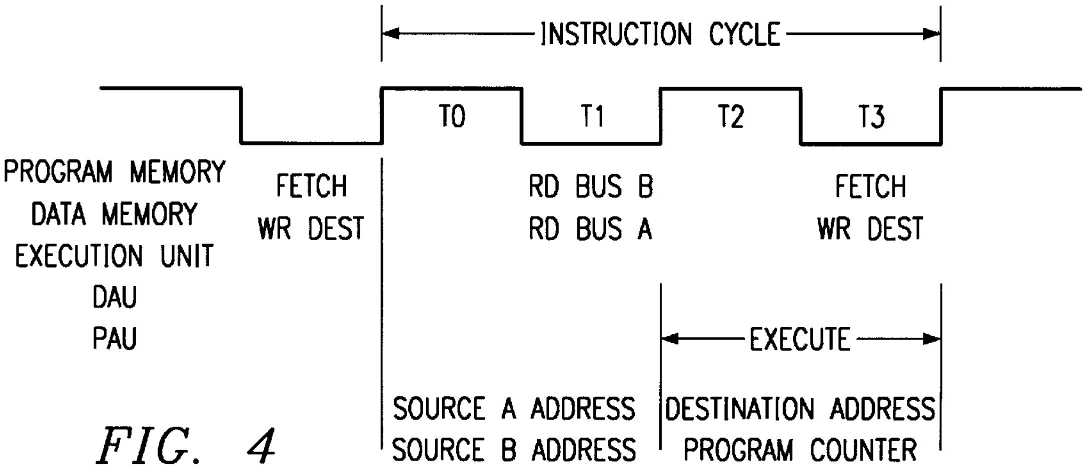
FIG. 4 is a diagram illustrating the operation of the DSPs of FIG. 3.

The overall operation of respective DSPs 200*a* and 200*b* can be described in reference to the diagram of FIG. 4. All instructions (instruction cycles) take two clock cycles (periods) to complete. During the first clock cycle, one operand is read from data memory 203 and a second operand is read from program memory 201/202 as directed by a prefetch instruction from program memory 201/202. During the second clock cycle, the result is stored in data memory 203 and the next instruction is prefetched from program memory 201/202.

Instruction execution occurs in four phases. In the first phase (T0), an instruction from a selected instruction register is decoded. In the second phase (T1), the A and B operands are read from registers or data memory. In the third phase (T2), an arithmetic or logic operation is performed by Execution Unit 303. In the fourth phase (T3), the result is stored and the next instruction is pre-fetched.

It should be noted that during the first half of the execution of typical arithmetic or logical instruction, the A operand to EU 303 is presented on Bus_A and the B operand to EU 303 is presented on Bus_B. During the second half of the execution of the instruction, the result from the EU 303 is presented on Bus_A and the next instruction fetched is presented on Bus_B.

Figure 3:
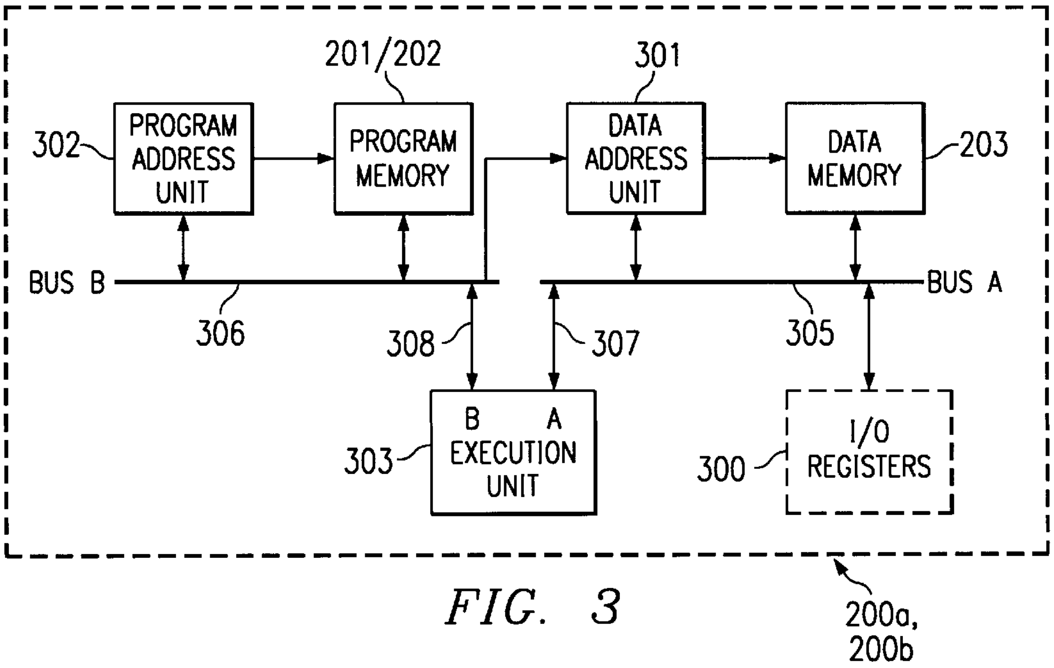
FIG. 3 depicts the organization of a selected one of digital signal processor (DSPs) cores within the processor block.

Advantageously, the architecture of FIG. 3, as operated as depicted in FIG. 4, does not employ pipelining and therefore, a user experiences no pipelining delays.

Figure 5:
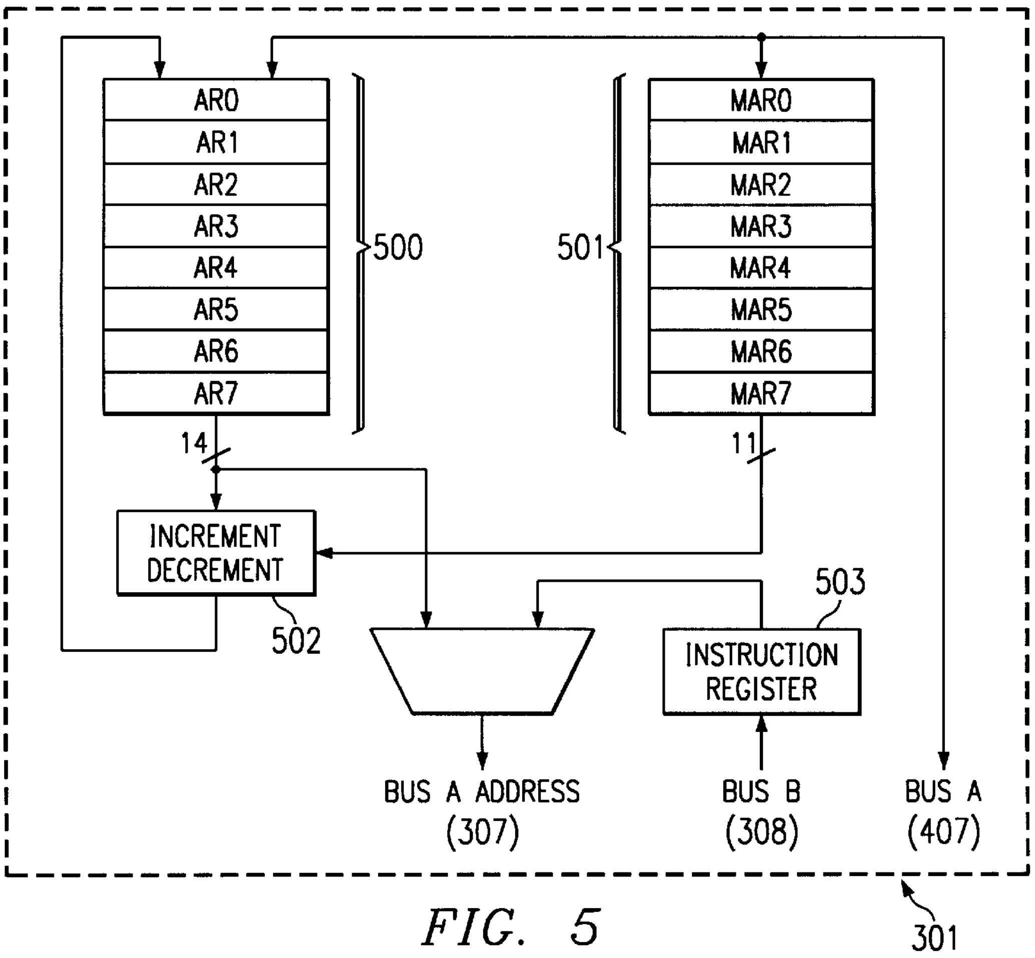
FIG. 5 is a detailed diagram of the Data Address Unit (DAU) within a selected DSP.

FIG. 5 is a detailed block diagram of Data Address Unit (DAU) 301. DAU 301 includes a block (stack) of address registers (ARs) 500, eight modulo address registers (MARs) 501, an increment/decrement unit 502, and an instruction register 503. Data Address Unit 402 supports addressing up to 16K words of data memory.

An instruction word received in instruction register 503 from Bus_B can independently specify both the source location of the A operand and the destination address for operand A. The A operand can be stored in an AR register 500, an I/O register 1300 (for register direct addressing) or a location in data memory 203 (for direct addressing). When it is a location in data memory 203, the instruction word specifies the seven LSBs of the data memory address for direct addressing or an AR 500 that contains the data memory address during indirect addressing.

When direct addressing is selected, address register AR0 is used as the A operand source page register and address register AR1 is used as the destination page register. Bits 13-7 of each page register are used as the MSBs of the given source or destination address, which along with the seven LSBs from the received instruction, create the entire 14-bit data memory address. When indirect addressing is selected, the 14 LSBs of a specified AR constitute the entire required 14-bit data memory address.

The 14-bit contents of any specified AR 500 can be post-incremented or post-decremented after being read to Bus_A by increment/decrement circuitry 502. This updated value is written back into that AR 500 at the end of the first half of the instruction cycle. In addition, addressing may be specified to be "bit-reverse post-increment" or "bit-reverse post-decrement." Bit-reverse addressing is very useful, for example, for addressing the results of an FFT (fast Fourier transform) operation.

Results from an operation performed by execution unit can be written to an AR 500, an MAR 501, an I/O register 1200, the accumulators ACC0 or ACC1 discussed below in conjunction with the Execution Unit 303, or any location in data memory 203. Each AR 500 is 14-bits wide and each MAR 501 is 11-bits wide. Thus, if an AR 500 is the destination, the low 14-bits of the result are written to that register and if a MAR 501 is specified as the destination, the 11 LSBs of the result are written thereto. If the result is written to data memory 203, the memory address is generated and/or post-modified in a manner similar to that used for the A operand address.

Every Address Register (AR) 500 is associated with a Modulo Address Register (MAR) 501. MARs 501 specify the size of circular buffers (reverse carry address blocks) of up to 2K words. For a buffer of size N+1, the value N is written to the MAR register. The circular buffer page is then determined from the upper bits of the corresponding AR register, and this page size scales with the buffer size N+1. The buffer size N+1 is represented with an M-bit number in the MAR and the circular buffer can start on $2^m$ block boundaries. The page is determined by bits 13-13M of the selected AR register. For example, if the AR0 register contains 0×3FF0 and MAR0 contains 0×00A, the address sequence generated by a series of instructions with post incremented addressing will be (0×3FF0, 0×3FF1, 0×3FF2, . . . , 0×3FFA, 0×3FF0, 0×3FF1, . . . ).

It should be noted that bit-reverse addressing is provided for efficient resequencing of data points, when processing such as a Radix-2 FFT routine is being performed. For this reason, buffer sizes for bit reverse buffers are always be set to a power of 2. Additionally, all addressing options are completely specified in the instruction word and can be performed on the A operand address as well as the destination address.

Figure 6:
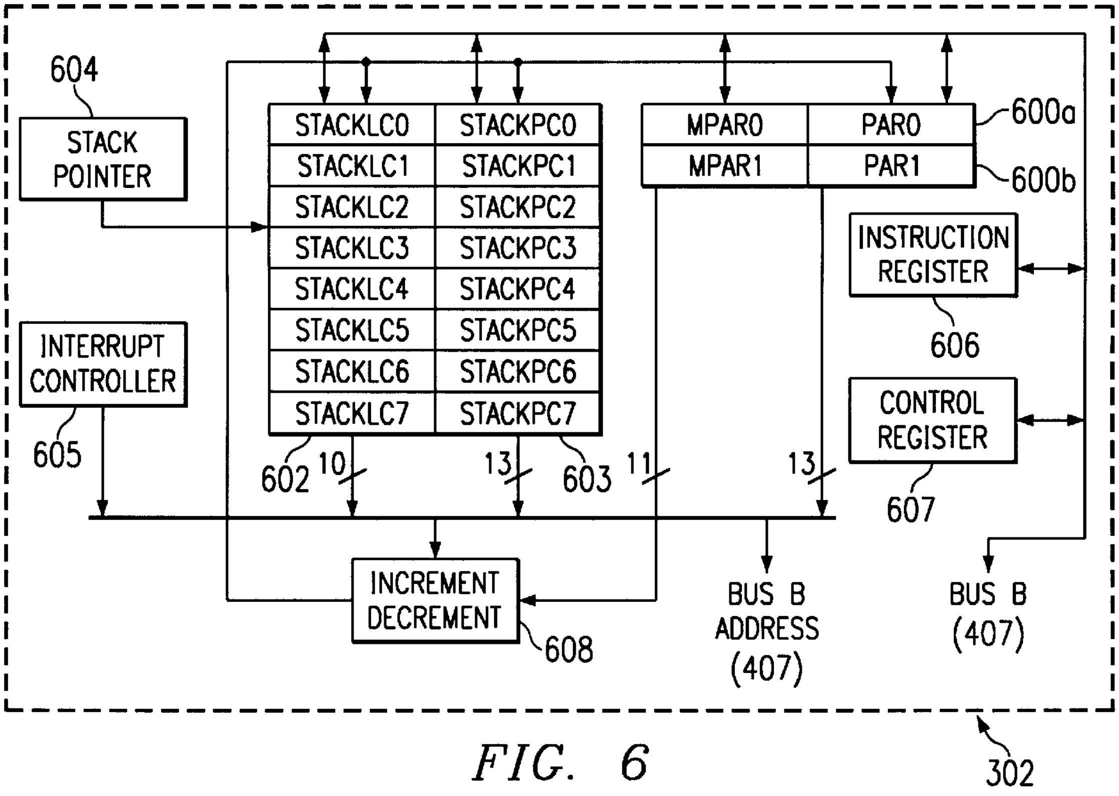
FIG. 6 is a diagram of a selected Program Address Unit (PAU)

FIG. 6 is a diagram of a selected Program Address Unit 302. Generally, Program Address Unit (PAU) 302 generates the 13-bit address for program memory 201/202, supporting a total of 8K words of program memory. Two program memory addresses are generated per instruction cycle. If the current instruction requires a source B address, the address generated by PAU 302 during the first half of the cycle is the B operand address. The address generated during the second half of the cycle is the next instruction address.

As shown in FIG. 6, PAU 302 consists of two 13-bit Program Address Registers (PARS) 600*a* and 600*b*, two 11-bit Modulo Program Address Registers (MPARs) 601*a* and 601*b*, eight stack locations 603 for storing 13-bit program counter (PC) values and eight stack locations 602 for storing 10-bit loop counter (LC) values. There is also a stack pointer 604 that points to the current PC and the current LC. Note that there is no dedicated PC or LC register. PAU 302 further includes an interrupt controller 605, instruction register 606, control register 607 and increment/decrement circuitry 608.

The next instruction address normally comes from the program counter stack location identified by pointer 604. After reading the instruction, the program counter in that location is incremented by circuitry 608. During a jump instruction (JMP), the jump address comes from an accumulator (ACC) or immediate short data. This address is loaded into the PC pointed to stack location during the first half of the jump instruction. The next instruction is read from the new address in the PC stack location.

When a jump-to-subroutine (JMPS) instruction is executed, the value in the pointed-to program counter location is incremented, the stack pointer 604 is incremented, and the jump address is written to the new PC stack location. When a return-from-subroutine (RET) instruction is executed, the stack pointer 604 is decremented and the next instruction is read from the old PC stack location. Incrementing stack pointer 604 pushes the PC and LC to the stack and decrementing the stack pointer pops the PC and LC from the stack. Since the stack has eight entries, one primary (main) routine and seven levels of subroutines are directly supported by the hardware. The stack is circular, which means that a stack overflow will overwrite data previously pushed onto the stack.

The load instruction (LD) and the repeat (REP) command can load a loop counter (LC) value from the Bus B during the first half of an instruction cycle into the current LC stack location (register). Loading this register causes the next instruction to be executed one time more than the number loaded into the LC. Every time the next instruction is executed, LC value in the current stack location is decremented. Since the current PC value does not have to be incremented, LC value is decremented by the increment/decrement unit 608 during the time that the PC value is normally incremented. Instructions with immediate data are not repeated.

Looping can be accomplished by repeating a jump to subroutine instruction. Nested loops are possible since both the PC and LC are pushed onto the stack during jump-to-subroutine execution. This type of looping has two instructions of overhead: jump to subroutine; and return.

During the first half of an instruction cycle, the B operand can be read from a program address register (PAR) 600 or from program memory 402. If the B operand comes from program memory, the address can come from PC+1 (immediate addressing) or a PAR 600 (indirect addressing).

If indirect addressing is specified, the contents of the specified PAR 600 can be post-modified. Specifically, the contents can be incremented or decremented by increment/decrement circuitry 608. There is no reverse carry option. Although post-modify can be specified in the instruction word, whether it is an increment or decrement is determined by the DEC bit in control register 607. When DEC is high, the contents of the specified PAR 600 is decremented.

Each PAR 600 has an associated Modulo Program Address register (MPAR) 601. MPARs 601 create circular buffers of length N+1 that start at $2^m$ block boundaries, where N is the value in the selected MPAR 601 and M is the number of bits used to represent N. This allows circular buffers of any length up to 2K words. The effect of the MPAR registers values on PAR values is identical to the MAR/AR register operation in DAU 403, discussed above.

The PC 603, LC 602, PARs 600, MPARs 601, control register 607, the top stack location and program memory pointed to by a PAR value can be loaded from immediate data (13 bits) or from the accumulator in Execution Unit 303. The LD (load) instruction loads them during the first half of an instruction cycle. The PC, LC, PARs, MPARs, control register 607, top stack location and program memory pointed to by a PAR can be read by a move program (MVP) instruction.

Figure 7A:
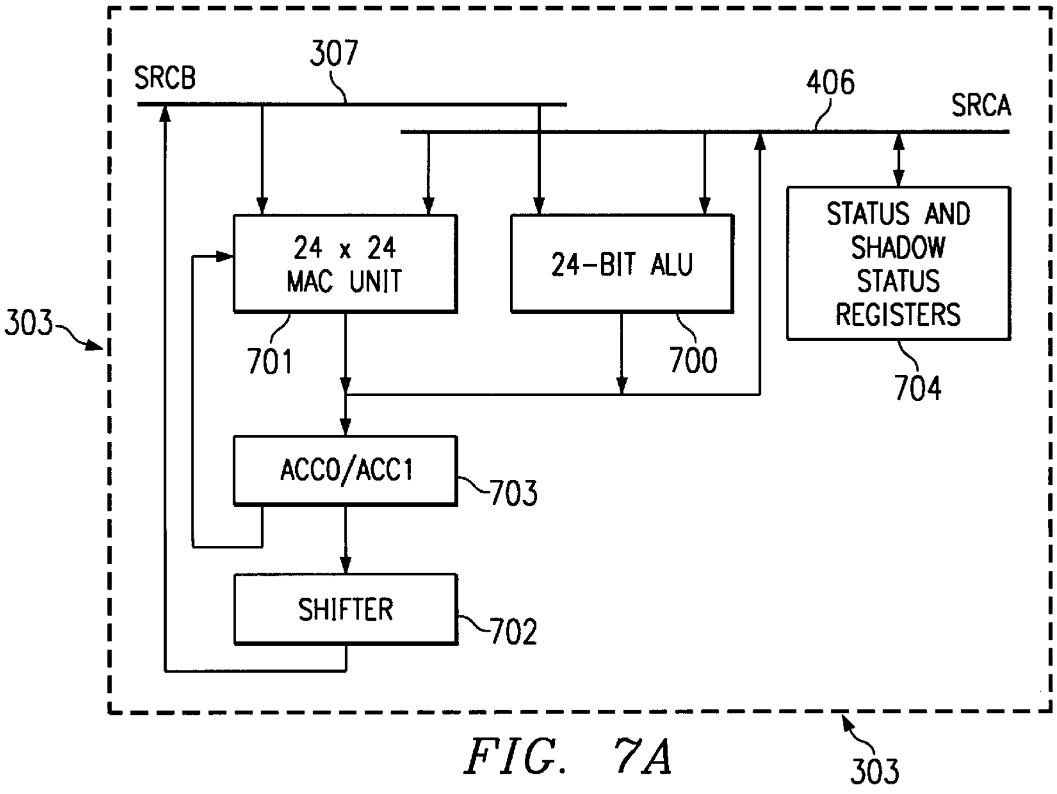
FIG. 7A is a diagram of the Execution Unit within a selected DSP.

Execution Unit (EU) 303 is generally the main processing block in each DSP 200. FIG. 7A is a diagram of a selected one of the Execution Units 303. As shown, it consists of an arithmetic/logic unit (ALU) 700, a multiply-accumulate unit (MAC) 701, a shift unit (SHF) 702, two 48-bit accumulator registers (ACC0/ACC1) 703 and status and shadow status registers 704.

Arithmetic/logic unit 700 is used for the 24-bit arithmetic and logic operations. When arithmetic/logic instructions are executed, 24-bit operands are read from the SRCA (source A) and SRCB (source B) buses 306 and 307 and the 24-bit result is returned on SRCA bus 306. If an ACC 703 is specified as the destination, the 24-bit result gets written into the high 24-bits of a designated one of the 48-bit accumulators 703. The low 24-bits of the designated accumulator 703 remain unchanged. The arithmetic/logic unit also includes saturation logic for arithmetic operations.

Multiply-accumulate (MAC) unit 701 is used for executing the multiply and multiply-accumulate instructions MPY (multiply), MPYL (multiply and load results in accumulator), MAC (multiply and add with accumulator contents), MACL (multiply, add with contents of accumulator and load result in accumulator), MSU (multiply and subtract from accumulator contents) and MSUL (multiply, subtract from contents of accumulator and load result in accumulator).

When any one of these instructions is executed, the 24-bit operands from SRCA bus 306 and SRCB bus 307 are first multiplied to generate a 48-bit result. When the MPY and MPYL instructions are executed, a zero is added to 48-bit result of the multiplication. The MAC and MACL instructions cause the 48-bit contents of a designated ACC 703 to be added to the multiplication result. When the MSU and MSUL instructions are executed, the 48-bit result of the multiplication is subtracted from a designated ACC 703. When an accumulator (ACC) 703 is specified as the destination, the low 24-bits of the result of a multiplication are always written to the low 24 bit positions of the selected 48-bit accumulator 703.

The high 24-bits of the result of the multiplication and addition (or subtraction) steps from the execution of the MPY, MAC and MSU instructions are driven on SCRA bus 406. If an accumulator 703 is specified as the destination, these 24-bits are also written into the high 24-bits of the given accumulator 703.

When any of the MPYL, MACL, and MSUL instructions are executed, the low 24-bits of the result of the addition are driven on SRCA bus 306. If an accumulator is specified as the destination, the low 24-bits of the result written into both the high and low 24-bit word positions of the designated accumulator 703.

Shift unit 702 allows for the scaling of the contents of a given accumulator 703 (e.g., as a result of a filter convolution). The shift (SHF) and shift low (SHFL) instructions each shift the 48-bit contents of the designated accumulator left by 1, 2, or 3-bits or right by one bit. The sign bit is extended during a shift right by one operation. When the SHF instruction is executed and an accumulator 703 is the destination, the 48-bit result of the shift is stored in the designated accumulator. When the SHFL instruction is executed and an accumulator 703 is the destination, the low 24-bits of the 48-bit result of the shift is written into both the low 24-bits and the high 24-bits of the designated accumulator. When an accumulator 703 is not the destination, the high 24-bits of the shift result are driven on bus SRCA 3406 during SHF execution and the low 24-bits during SHFL execution.

Barrel shift operations are performed in the MAC unit 701. Barrel shifting left for 24-bit operands can be accomplished by multiplying the operand by $2^N$ and storing the low result, where N designates the number of bit positions shifted. Barrel shifting right can be accomplished by multiplying by $2^{(24-N)}$.

Shift unit 702 and arithmetic/logic unit 700 are used for executing the divide instruction. The divide instruction (DIV) divides the contents of the designated accumulator 703 by the operand presented on SRCA bus 406 to perform one iteration of a non-restoring fractional division algorithm. Hence, the DIV instruction is repeated 24 times to complete a 24-bit division. After 24 iterations, the high 24-bits of the accumulator contain the partial remainder and the low 24-bits contain the quotient. Each DIV instruction first requires that an exclusive-OR (XOR) operation on the sign-bits of the operands from SRCA bus 306 and the contents of the designated accumulator. The contents of the accumulator are then shifted left by one bit with the carry bit (C) shifted into the accumulator LSB position, except during the first iteration when the C bit is cleared. If the result of the XOR operation of the previous iteration was a logic one, the operand on SRCA bus 306 is added to the high 24-bits of the designated accumulator and the result stored back in the high 24-bits of the designated accumulator. If the result is zero, the operand from SRCA bus 306 is subtracted from the high 24-bits of the designated accumulator and the result stored back in the accumulator high 24 bits. The carry from an add or subtract sets the carry for the next iteration.

For a complete description of the bitfields of the Status Register, as well as those of other registers of decoder 100, please refer to any of the copending applications incorporated by reference above.

Each DSP core 200 supports up to sixteen individual hardware interrupts via interrupt interface 207 and PAUs 304. Interrupts are enabled by setting the (Interrupt Enable) IEN bit in control register. Each interrupt can be individually disabled by clearing the corresponding mask bit (MSK0–MSK15) also in control register.

The interrupts are priority encoded to resolve conflicts when multiple interrupts occur simultaneously. The non-maskable interrupt has higher priority than the maskable interrupts. Of the maskable interrupts, interrupt 0 is highest priority and interrupt 15 is lowest.

An interrupt is detected by program address unit 304 at the end of the instruction cycle during which the interrupt occurred. Since the next instruction has already been fetched, it is executed before the instruction at the interrupt vector location is executed. Thus, there is a one to two instruction cycle delay from the time the interrupt occurs until the instruction at the interrupt vector location is executed.

Interrupts can be long or short. A short interrupt occurs if the instruction at the interrupt vector location is anything but a JMPS (jump) instruction. After a "short interrupt" instruction executes, program control switches back to normal. The instruction at the interrupt vector location cannot have immediate data.

A long interrupt occurs if the instruction at the interrupt vector location is a JMPS instruction. When the jump occurs, the IEN bit is cleared to disable further interrupts. Also, the contents of the status and shadow status registers swap. When a return-from-interrupt (RETI) instruction is executed, the IEN bit is set, the status and shadow status registers are again swapped, and program control switches back to normal. The status and shadow status registers do not swap on short interrupts.

There are two reset mechanisms for each DSP 200 as well as for the entire chip itself, hardware reset and software reset. A hardware reset is asserted with the presentation a low level on a RESET pin. A low-to-high transition on this pin initializes the hardware and causes the logic DSP 200 to begin execution at address 0×1000. The ROM code in program ROM 202 for that DSP 200 at this address may then perform further software initialization of the chip or optionally download code from a host to program RAM. A software reset is asserted by writing a one to the RS bit in the control register 607, which initializes the hardware and causes DSP 200 to begin execution at address 0×0000. In either case, all internal registers are reset to their initial state except for the host mode select bits in the host interface and the remapping registers in the RAM repair unit.

Status and Shadow Status registers 706 are connected to the SRCA bus 306. Since they are I/O mapped, they can be used as the SRCA operand or destination for most ALU operations. Control register 607 (FIG. 6) is connected to the SRCB bus and is loaded by the LD instruction and read by the MVP instruction.

A LD (load) instruction can be used to write the contents of accumulators 703 or immediate short (13 bits) data to a PAR 600, an MPAR 601, the control register(CR), the program counter (PC), the loop counter (LC), or the last PC and REP pushed onto the stack (PC-1 and LC-1). It can also write the contents of an accumulator 703 or immediate short data to program memory pointed to by the contents of a PAR 600.

The MVP (move program) instruction can move immediate long data, the contents of an accumulator 703, PAR 600, MPAR 601, Control Register 607, a Program Counter register 603 or a Loop Counter register. It can also move program memory 201 contents pointed to by the contents of PAR 600 to any destination described above and any of the stack pointer locations (STACKPC[0–7] and STACKLC [0–7]). The information in the specified PAR 600 can be post modified or not post modified.

The contents of a stack pointer 604 can be accessed by reading bits 5–7 of the Status register. Bits 5–7 of the Shadow Status register are always low.

Generally, the instruction set allows flexible addressing of two source operands and the destination of the result. In one instruction the main ALU operation is performed and up to three memory address pointers can be updated. The assembly code syntax is: OPCODE SRCA, SRCB, DEST.

Figure 8:
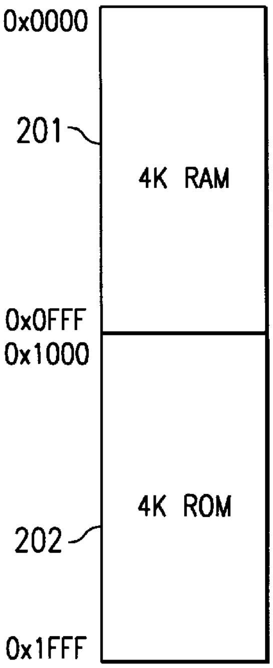
FIG. 8 is a diagram illustrating the organization of each 8K program memory space.

The program memory maps are identical for both DSPA and DSPB. Each 8K program memory space is organized as shown in FIG. 8. Each DSP 200 is supported by 4K of program RAM 201 and 4K of program ROM 202. Addresses 0×0000-0×001F and 0×1000–0×1002 to program RAM 201 are also reserved for accessing interrupt and reset vectors. The remainder of program RAM 201 memory space is available for accessing program instructions. The program ROM 202 memory space is used to store boot, RAM self-test and debug software, as well as application specific tables and microcode.

Figure 9:
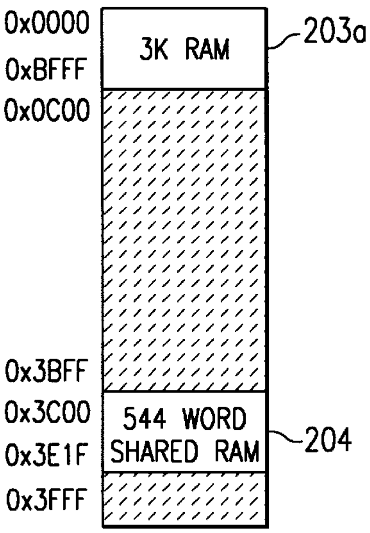
FIG. 9 is a diagram of the data memory space available to DSPA of FIG. 2.

FIG. 9 is a diagram of the data memory space available to DSPA 200*a*, which includes 3 Kilobytes of data RAM 203*a* and the 544 word (24-bits per word) memory space of shared data RAM 204. For DSPA, addresses 0×0C00–0×3BFF and 0×3E20–0×3FFF are not implemented.

Figure 10:
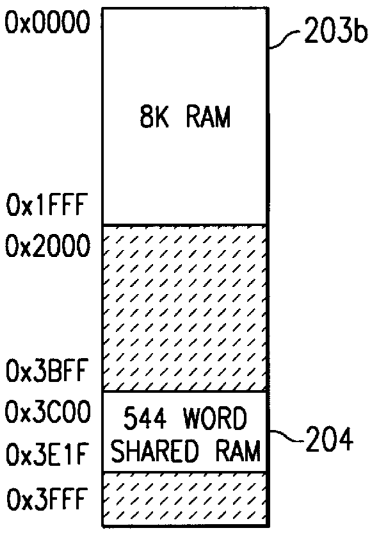
FIG. 10 is a diagram of the memory space available to DSPB of FIG. 2.

FIG. 10 is a diagram of the memory space available to DSPB 200*b*, which includes 8K of data RAM 203*b* and the 544 word memory space of shared data RAM 204. For DSPB, addresses 0×2000–0×3BFF and 0×3E20–0×3FFF are reserved.

Figure 11:
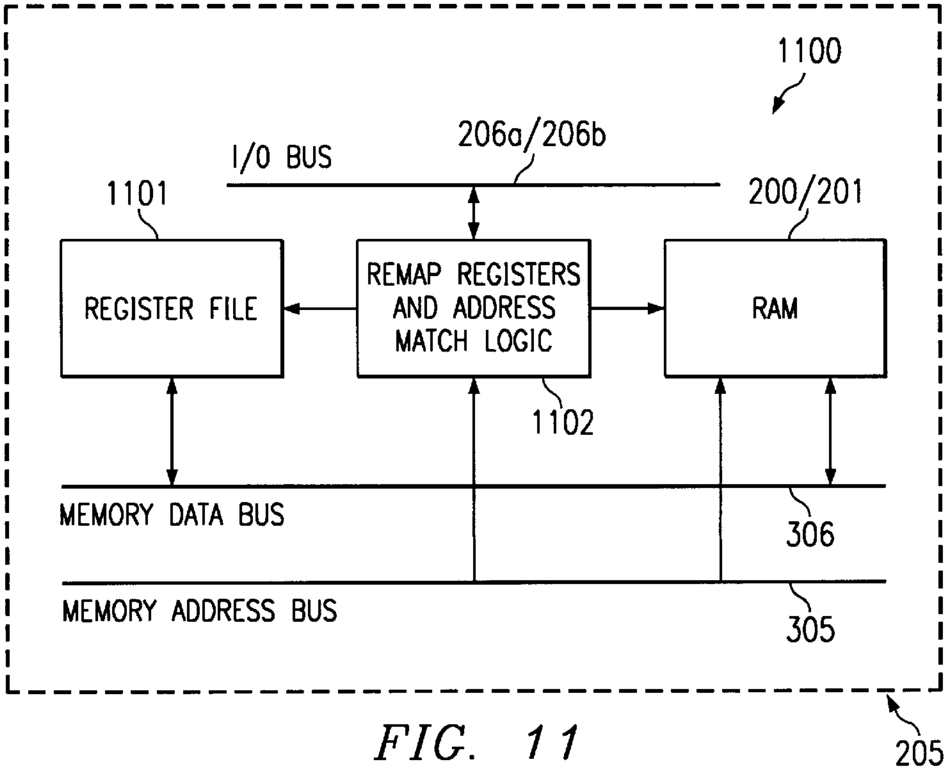
FIG. 11 is a diagram of a selected RAM repair unit in the RAM repair block shown in FIG. 12.

Due to the large amount of RAM included in device 200, a RAM repair unit 205 has been provided to improve manufacturing yields. A functional block diagram of a selected RAM repair units 1100 within RAM repair units block 205 is shown in FIG. 11. RAM repair unit 1100 includes a register file 1101 and remap registers and address match logic 1101. Each memory block (DSPA program memory 201*a*/202*a*, for example) has an associated register file as auxiliary memory that can be mapped to addresses within the memory block. Upon reset, the boot software can be instructed by the host to verify the repair registers, execute a memory test, and remap bad memory locations to register file 1101 locations.

Each location in register file 1101 has an associated remap register in circuit block 1101. The remap registers appear as a 'peripheral' to DSPs 200 and are accessed via the I/O buses 206. When a defective RAM location is identified, the corresponding address is written to an available remap register that is then enabled. Once enabled, the remap register monitors the memory address bus for addresses accessing the defective location. All future accesses to the defective location are redirected to the local register file instead of the main RAM block.

There are four repair circuits 1100 within block 205, one for each of the main memory buses 405 and 406, and I/O buses 206*a* and 206*b*. Each repair circuitry 1100 is statistically sized to provide enough extra remap locations to repair a high percentage of point failures anticipated for the RAMs.

For the DSPA program memory 201*a*, DSPA data memory 203*a*, and DSPB program memory 201*b*, there are eight memory remapping locations in the associated register file 1101. In the case of DSPB data memory 203*b*, there are sixteen memory remapping locations in the associated register file 1101. Data memory remap registers have a 14-bit address field covering the entire data memory range and program memory remap registers have a 12-bit address field to cover the lower 4K of program RAM. The remap registers are not initialized by hardware or software reset, and therefore require software initialization at startup.

Repair circuits 1100 are mapped to the I/O map for each DSP 200, with each DSP 200 can only access remap registers for its own memories. Each remap register controls one remap channel, and all remap channels are identical except for address width.

Shared memory block 204 provides a high-bandwidth communication channel between the two DSP cores 200. To each DSP core 200*a* or 200*b*, shared memory 204 operates like conventional RAM. However, shared memory 204 occupies the same logical addresses in each DSP address space. Control of data memory access is left to the software; there are no provisions in hardware to indicate or prevent access collisions.

In the event of an access collision, the hardware responds as follows:

(i) if both cores 200 are attempting to read shared memory 204 the same clock cycle, the address from DSPB is used for the memory access;

(ii) if both cores are attempting to read from shared memory 204, the data specified by the DSPB 200*b* generated address is read by both cores;

(iii) if both cores are attempting to write to shared memory 204 during the same clock cycle, the DSPB write operation is completed and the DSPA request is ignored.

The software protocol discussed below ensures that shared memory access collisions do not adversely affect the application running.

Each DSP core 200 supports a 32-word I/O space. The I/O space includes 3 page-indicator bits that are located in registers in the IPC register block 302. Combined, these fields generate an 8-bit I/O register address.

To avoid context switch and control problems, the lower 16 addresses on all pages map to the same physical registers. Critical registers (such as IPC and Status registers) are mapped to these locations and are always accessible regardless of the page setting. The upper 16 addresses on each page are allocated to various input and output blocks.

Figure 12:
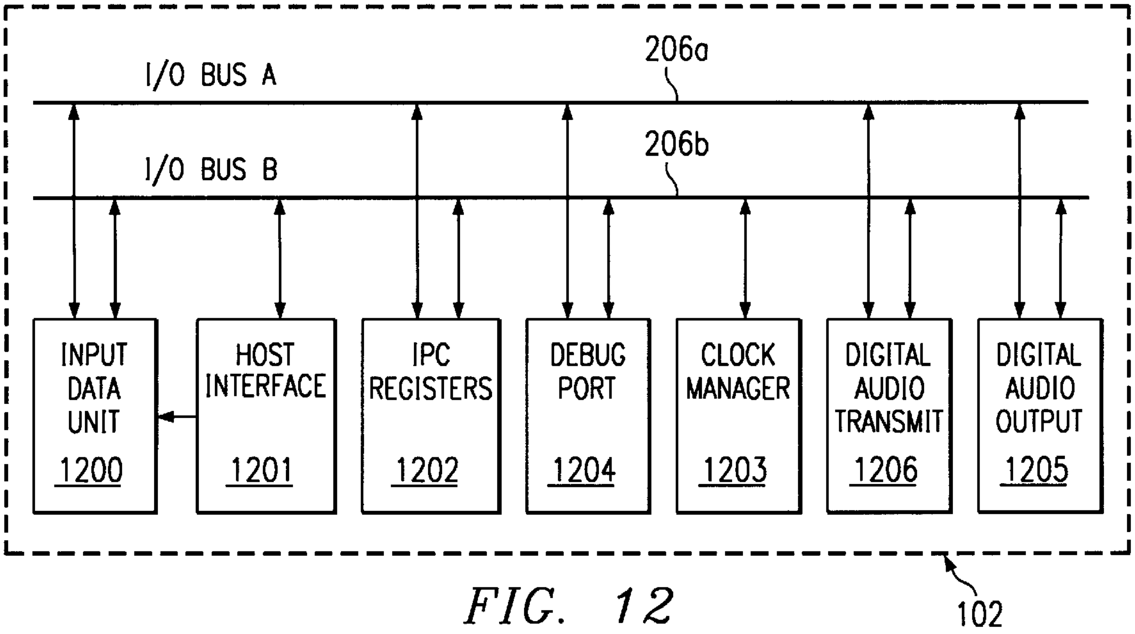
FIG. 12 is a diagram of the primary functional subblock of the I/O block of FIG. 1C.

FIG. 12 is a detailed functional block diagram of I/O block 102. Generally, I/O block 102 contains peripherals for data input, data output, communications, and control. Input Data Unit 1100 accepts either compressed analog data or digital audio in any one of several input formats (from either the CDI or DAI ports). Serial/parallel host interface 1201 allows an external controller to communicate with decoder 100 through the HOST port. Data received at the host interface port 1201 can also be routed to input data unit 1200.

IPC (Inter-processor Communication) registers 1202 support a control-messaging protocol for communication between processing cores 200 over a relatively low-bandwidth communication channel. High-bandwidth data can be passed between cores 200 via shared memory 204 in processor block 101.

Clock manager 1203 is a programmable PLL/clock synthesizer that generates common audio clock rates from any selected one of a number of common input clock rates through the CLKIN port. Clock manager 1203 includes an STC counter which generates time stamp information used by processor block 101 for managing playback and synchronization tasks. Clock manager 1203 also includes a programmable timer to generate periodic interrupts to processor block 101.

Debug circuitry 1204 is provided to assist in applications development and system debug using an external DEBUGGER and the DEBUG port, as well as providing a mechanism to monitor system functions during device operation.

A Digital Audio Output port 1205 provides multichannel digital audio output in selected standard digital audio formats. A Digital Audio Transmitter 1206 provides digital audio output in formats compatible with S/PDIF or AES/EBU.

In general, I/O registers are visible on both I/O buses, allowing access by either DSPA (200*a*) or DSPB (200*b*). Any read or write conflicts are resolved by treating DSPB as the master and ignoring DSPA.

Figure 13:
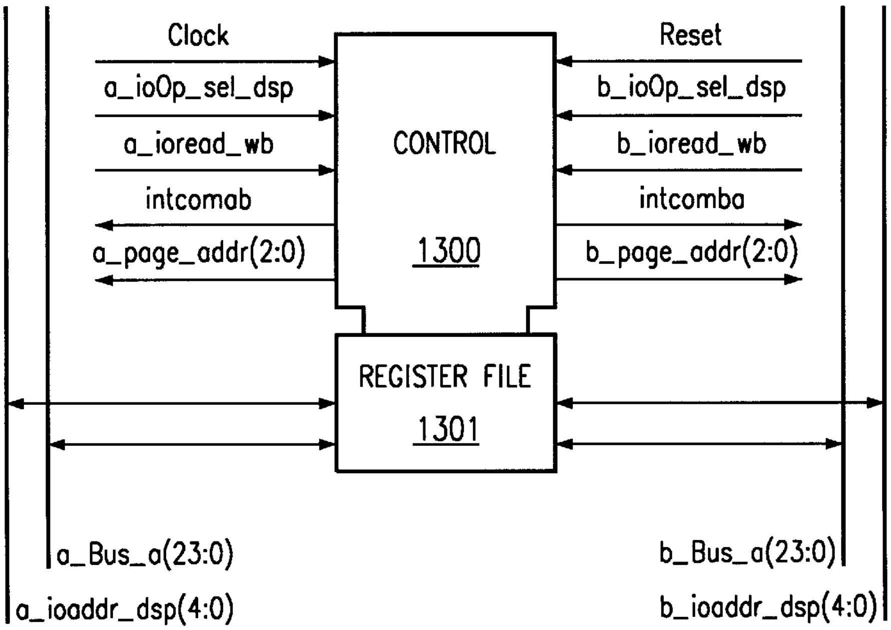
FIG. 13 is a functional block diagram of the interprocessor communication (IPC) block within the I/O block of FIG. 12.

FIG. 13 is a functional block diagram of the interprocessor communication block 1302 which includes control registers 1300 and a register file 1301. All of the IPC registers are available in all I/O pages, since they are mapped to I/O addresses 0×00–0×09. Therefore, DSP inter-processor communication is supported regardless of the I/O page setting.

Ten I/O mapped registers are available for interprocessor communication. There are two sets of registers, one for each processor 200. These registers are intended as a low bandwidth control and communication channel between the two DSP cores 200. In particular, command, command pending, and parameter registers are provided for use by the software to implement a communication protocol between processors 200. The command and parameter registers are 24-bits wide; the command pending registers are 8-bits wide. Interpretation of the register bit fields is also defined by software. Two of the registers (COM_BA and COM AB) generate hardware interrupts (intcomba and intcomab) in DSPA and DSPB respectively when written.

Clock manager 1303 can be generally described as programmable PLL clock synthesizer that takes a selected input reference clock and produces all the internal clocks required to run DSPs 200 and audio peripherals. Control of clock manager 1303 is effectuated through a clock manager control register.

The reference clock can be selectively provided from an external oscillator, or recovered from selected input peripherals. The clock manager also includes a 33-bit STC counter, and a programmable timer which support playback synchronization and software task scheduling.

Figure 14:
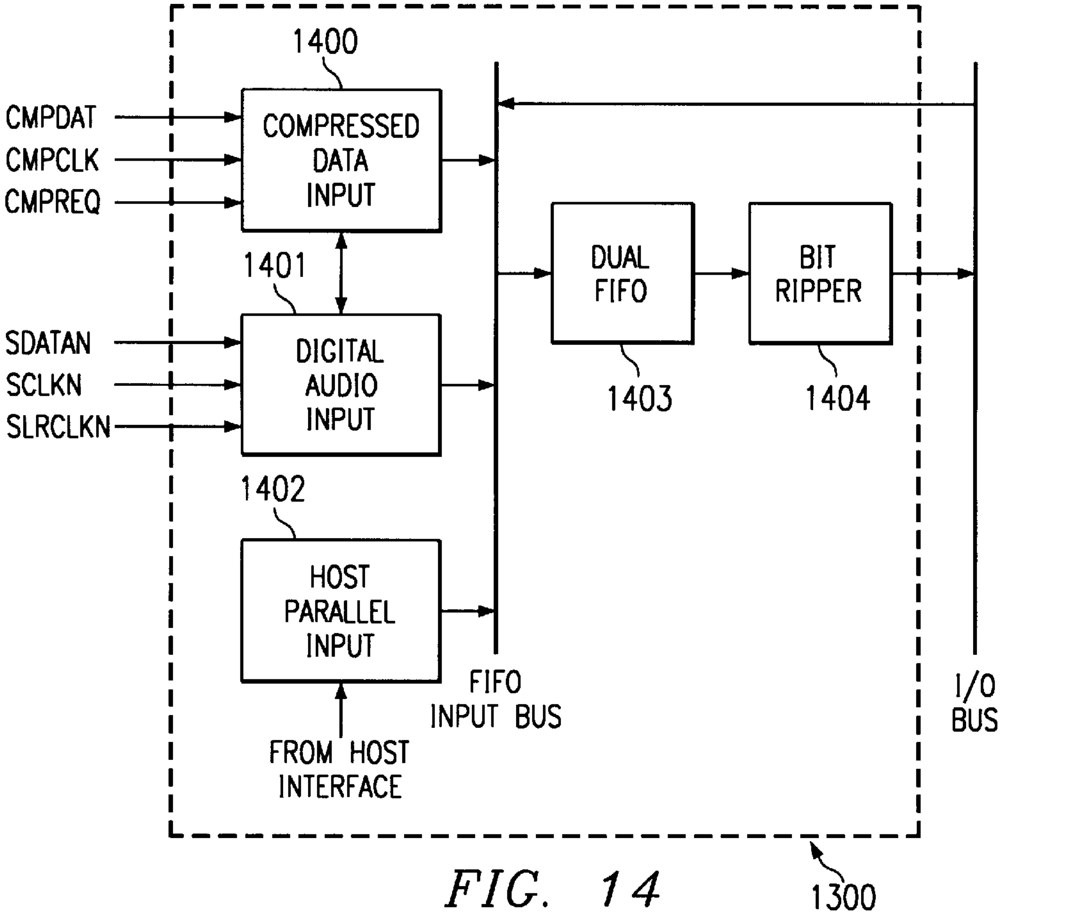
FIG. 14 is a detailed block diagram of the Input Data Unit of FIG. 12.
Figure 15:
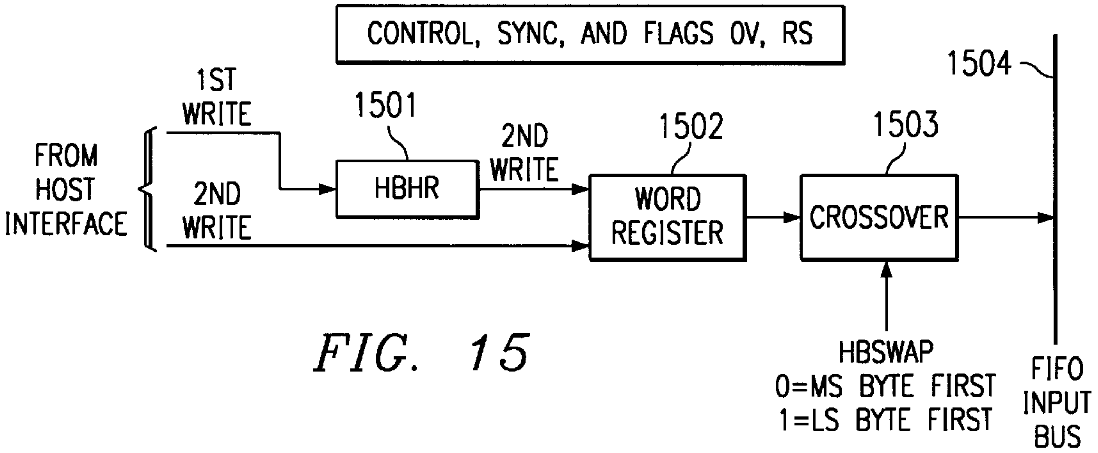
FIG. 15 is a diagram of one Host Parallel Input.
Figure 16:
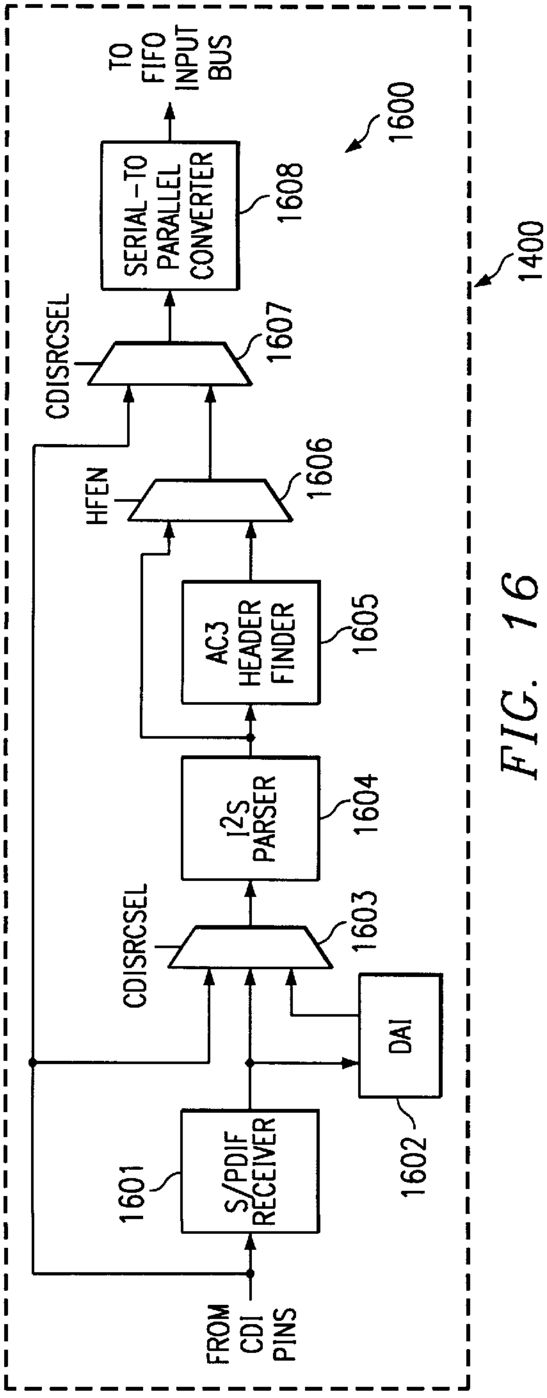
FIG. 16 is a diagram of the Compressed Data Input (CDI) port.
Figure 17:
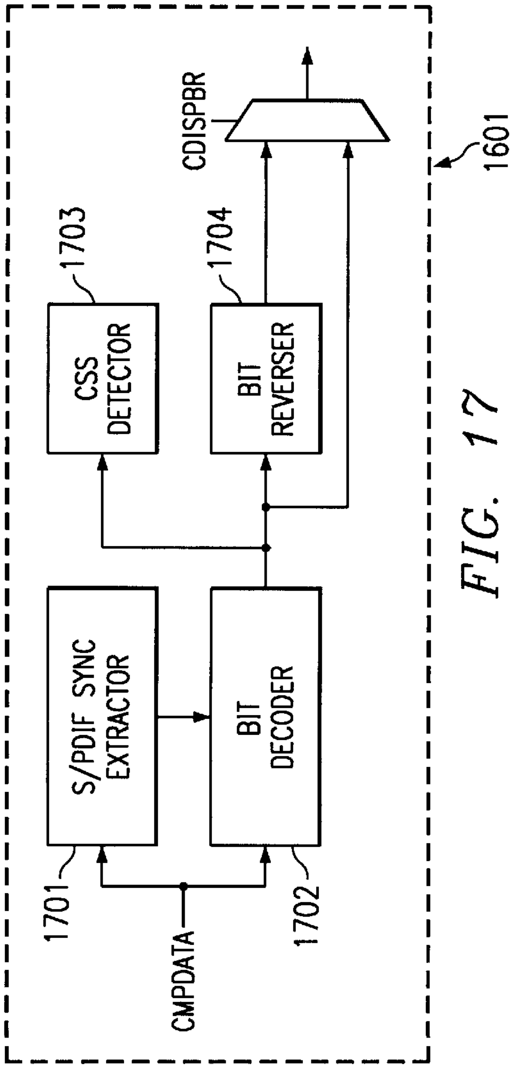
FIG. 17 is a detailed block diagram of S/PDIF data receiver.
Figure 18:
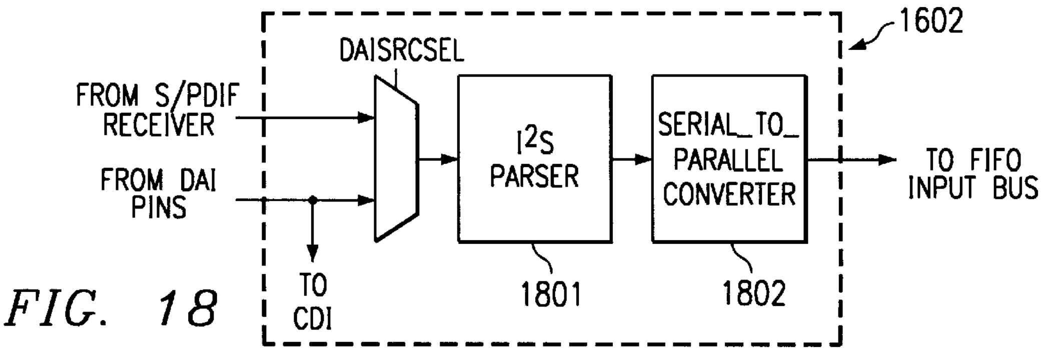
FIG. 18 is a diagram of the digital audio input (DAI) port.

FIG. 14 is a more detailed block diagram of Input Data Unit 1300 (FIG. 13). Input Data Unit 1300 is made up of a compressed data input port (CDI) 1400, a digital audio input port (DAI) 1401, host parallel input 1402, a dual input FIFO 1403, and a bit-ripper 1404. The compressed data and digital audio inputs feed the input FIFO and support a variety of data input formats, including S/PDIF and $I^2S$. Data can also be routed from host interface port 301 to the input FIFO via the host input port. The dual FIFO unit temporarily stores the data received from the input ports prior to its being processed by the DSPs. The input FIFO in turn feeds the bit-ripper block, which provides hardware assistance to the DSP cores in bit parsing routines.

Both DSPs 200*a* and 200*b* have access to Input Data Unit 1300. The I/O registers are allocated such that if both DSPs 200 attempt simultaneous I/O operations to FIFO 1403 or the input unit registers, DSPB 200*b* will complete its operation and DSPA 200*a* will be ignored. If only one DSP 200 accesses input unit 1300 at any one clock cycle, that DSP will get an I/O cycle. Software is assumed to allocate the input unit to only one of the two DSPs at any one time.

Dual FIFO 1403 may be loaded from any of the available data sources, selected by the FBSRCSL and FCSRCSL bit fields of a Configuration, Control, and Reset register (CCR). However, only one source at a time may be selected to be input to a FIFO channel, and only one FIFO channel can be tied to any source at any one time.

Host Parallel Inputs 1402 are located at address 0×2 and 0×3 of the Host Interface. These are identical data input ports, allowing an external device to write data directly into input FIFO 1403. Each port has a High Byte Holding register (HBHR) 2001, a 16-bit Word register (WR) 2002, an overrun bit (OV), a clear bit (CLR), crossover 2003 and synchronization logic. The OV and CLR bits for each are visible to the DSPs in the CCR register. A more detailed block diagram of one Host Parallel Input is provided as FIG. 15.

Each port 1402 receives data as a sequence of bytes. When the device 100 is reset, or when the given port's CLR bit is set (CLR=1), writing of FIFO 1403 by Host Parallel Input port 1402 is disabled. When the port's CLR bit is clear (CLR=0), writing of FIFO 1403 by Host Parallel Input 1402 port is enabled.

The first byte written to the given port 1402 by the host processor is written from the Host Interface 1301 into the HBHR 2001. The second write into the port by the host processor is written to the Word register (WR) 2002, along with a copy of the HBHR contents. This also initiates a write request in the synchronizer. In the next time-slot associated with writes to FIFO 1403 that is allocated to the given Host Input port 1402, the WR data is copied onto the FIFO Input Bus 2004 through selectable crossover 2003 and the write request in the synchronizer is cleared. The crossover places the first byte on the high half of FIFO Input Bus 2004 and the second byte on the low half of bus 2004 if HBSWAP=0 (MS byte first). If HBSWAP=1, the first byte is placed on the low half of bus 2004 and the second byte is placed onto the high half of bus 2004 (LS byte first).

Given that there is only one bus cycle allocated to writing each FIFO in every 4 clock cycles, the Host Input port 1402 can accept data no faster than once every 4 DSP clocks. Typically this cycle will be about 80 ns. Should the host processor attempt to write data at a higher rate, a host overflow will occur and the port's overflow bit (0 V) will be set. This bit is sticky and will not clear until the processor is reset or one of the DSPs writes it with a zero.

Compressed Data Input (CDI) port 1400 can accept compressed data in several formats. CDI port 1400 consists of an S/PDIF receiver 2101 for decoding the Sony/Phillips Digital Interface Format, digital audio interface (DAI) 2102, an $I^2S$ Input parser 2104, AC-3 header finder 2105, serial-to-parallel converter 2108 to interface to the input FIFO, and multiplexer 2103, 2106, and 2107.

CDI port 1400 can accept data in the following formats: serial compressed data; serial data in $I^2S$ format; PCM data in $I^2S$ format; compressed data in S/PDIF format; or PCM data in S/PDIF format.

The CDISRCSEL field in the CCR register configures the compressed data port. For compressed data mode, the CDI pins are connected directly to serial-to-parallel converter 2108. To receive data in $I^2S$ formats, the CDI pins are coupled to the $I^2S$ Parser 2104. Alternatively, information from the DAI pins 2102 can be routed to the $I^2S$ Parser 2104. For S/PDIF format input, the CDI pins are connected to S/PDIF receiver 2101, whose output is then directed to $I^2S$ parser 2104 in either the CDI or DAI block. CDI port 2100 also includes AC-3 Header Finder block 2105, which strips out null characters in an AC-3 formatted stream to reduce the amount of data that must be stored in the input FIFO.

S/PDIF receiver 2101 accepts a biphase encoded stream and extracts framed data to be passed on to the $I^2S$ parser. A more detailed block diagram of S/PDIF receiver 2101 is provided in FIG. 17. S/PDIF receiver 2101 includes a sync extractor 2201, a bit decoder 2202, a channel status block (CSB) detector 2203, and a bit reverser 2204.

Bit decoder 2202 recovers the encoded data, while sync extractor 2202 recovers the embedded clock of the S/PDIF input. S/PDIF receiver 2101 operates on 32-bit subframes, with a maximum of 24-bits of payload per subframe.

Bit reverser 2204, when enabled, reverses the bit order of the 32-bit subframe before passing the data to parser 2104. This process inserts a one-subframe delay. The S/PDIF format incorporates a channel status bit in time slot 30 of each subframe. Channel status block detector 2203 monitors the S/PDIF data stream and captures 32-bits of a channel status block from successive S/PDIF subframes. The CSBSTRMSEL bit selects which frame to extract channel status block data from. The CSBBSEL field can be programmed to select time slot 28–31, allowing User, Validity, or Parity bits to be extracted instead. After 32-bits of channel status have been captured, the data is latched into registers CSBHI and CSBLO where they can be read by the DSP.

Channel status block detector 2303 sets the CSBINT bit after receiving each 32-bits of a channel status block and generates an interrupt to the DSP. The CSBINT bit is cleared when the CSBHI field is read from the CDICLK register. The CSBFST bit indicates whether the 32 bits received are the first 32-bits of a channel status block. Software is responsible for determining where subsequent 32-bit blocks fit in the 192-bit channel status block.

$I^2S$ parser 2104 accepts input data directly from the CDI or DAI pins, or recovered data from S/PDIF receiver 2101. The $I^2S$ parser can operate in slave mode (with clocks provided from an external source) or in master mode (with clocks derived from an internal 512Fs clock from the clock manager). The CDIMCL bit is used to select the clock mode. In master clock mode, the CDIBCLKD field in the CDICTL register and the CDILRCLKD field in the CDICLK register control the rates of the CDI port serial bit clock and LR sample clock, respectively. $I^2S$ parser 2104 employs a flexible data capture scheme based on the CDIBSTART and CDIBSTOP fields in the CDICTL register. The CDIBSTART and CDIBSTOP values indicate the first and last bits of the range to be captured from a subframe. Further, the CDIFRMSEL field controls whether to capture data from a particular subframe or from both subframes. The CDICLKPOL bit determines whether the shift clock (bit clock) is active on rising or falling edges.

The CDIMARKEN bit enables the subframe identifier injector block, which adds a 4-bit marker at the end of a captured data field. If LR clock is low, the code 0×9 is inserted in the data stream as it is sent to Serial-to-Parallel converter 2108. If LR clock is high, the code 0×A is inserted. These markers may be used by the software drivers to verify that data is aligned properly as it is read from FIFO 1903, since captured audio data may not align on 16-bit word boundaries.

A Dolby AC-3 stream embedded in an S/PDIF signal is comprised of a header, a block length indicator, and filler bits. Header Finder 2105 is provided to strip off most of the filler bits in the stream to reduce the amount of data sent to input FIFO 1403.

AC-3 Header Finder 2105 is enabled with the HFEN bit in the CCR register. When enabled, Header Finder 2105 delays data to the Serial-to-Parallel converter 2108 by 32 bit periods. Specifically, Header Finder 2105 scans the data stream searching for the 32-bit header constant 0×F8724E1F. Once the header is matched, Header Finder 2105 extracts the header and a 16-bit-data-block-length field. The data block length field is used to extract the payload bits from the stream. Since Serial-to-Parallel 2108 converter writes 16-bit words to FIFO 1903, an additional 16-bits of padding are added to the end of the payload to ensure that the full payload is flushed into the FIFO. The resulting record in FIFO 1403 includes the header constant, additional header information, the payload size, the payload data, and 16 filler bits.

Serial-to-Parallel 2108 converter accepts serial data from $I^2S$ Parser 2104 or Header Finder 2105 and converts it to 16-bit word. The 16-bit word is then synchronized to the DSP clock and written into input FIFO 1403 in the next available time slot. Serial-to-Parallel converter 2108 can be enabled and disabled with the CDI_EN bit in the CDICTL register.

Alternatively, Serial-to-Parallel converter 2108 can accept input data directly from the pins, and therefore also includes logic to generate requests and automatically control data flow into the FIFO. The bits to configure this function are located in the CCR register. The DRQEN bit enables the data request function, and the DRQPINEN bit enables the request logic to drive the CMPREQ pin. The DREQPOL bit determines if the request signal is active high or active low. The DREQFCSEL bit selects whether to use flags from FIFO B or FIFO C to generate requests, and the DREQLEVSEL bit selects either the MF or OV flag from the appropriate FIFO. After configuration, this compressed-data interface can be used to automatically assert the request line if the FIFO is not full, and de-assert the request line as the FIFO approaches a full condition.

Digital Audio Input port (DAI) 2102 is a simplified version of the CDI port 1900. The unit does not include an S/PDIF interface, although it can be coupled to receive data from the CDI port S/PDIF receiver. It also does not include the Header Finder and compressed data request logic.

$I^2S$ parser 2301 of DAI 2102 accepts input data directly from the DAI pins, or recovered data from S/PDIF receiver 2101. The data source is selected by the DAISRCSEL bit in the CCR. The $I^2S$ parser can operate in slave mode (with clocks provided from an external source) or in master mode (with clocks derived from an internal 512Fs clock from the clock manager). The DAIMCL bit is used to select the clock mode. In master clock mode, the DAIBCLKD field in the DAICTL register controls the rate of the DAI port's serial bit clock. The LR sample clock is shared with CDI port 1400, and therefore its rate is determined by the LRCLKD field in the CDICLK register. Note that if both the CDI and DAI port for the $I^2S$ parsers are operating in master clock mode, the same sample rate is used.

$I^2S$ parser 2301 employs a flexible data capture scheme based on the DAIBSTART and DAIBSTOP fields in the DAICTL register. The DAIBSTART and DAIBSTOP values indicate the first and last bits of the range to be captured from a subframe. Further, the DAIFRMSEL field controls whether to capture data from a particular subframe or from both subframes. The DAICLKPOL bit determines whether the shift clock (bit clock) is active on rising or falling edges.

The DAIMARKEN bit enables the subframe identifier injector block, which adds a 4-bit marker at the end of a captured data field. If LR clock is low, the code 0×9 is inserted in the data stream as it is sent to the Serial-to-Parallel Converter. If LR clock is high, the code 0×A is inserted. These markers can be used by the software drivers to verify that data is properly aligned as it is read from the FIFO, since captured audio data may not align on 16-bit word boundaries.

Serial-to-Parallel converter 2302 accepts serial data from $I^2S$ parser 2301 and converts it to a 16-bit word. The 16-bit word is then synchronized to the DSP clock and written into input FIFO 1403 in the next available time slot. Serial-to-Parallel converter 2302 can be enabled and disabled with the DAIEN bit in the DAICTL register.

Figure 19:
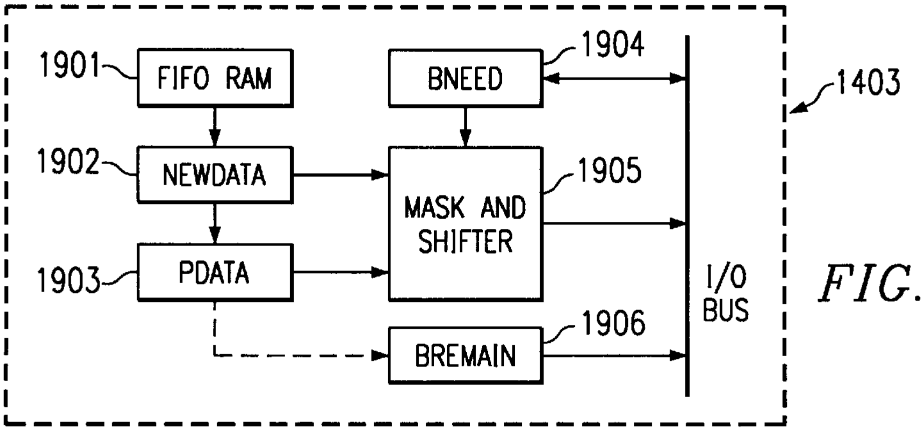
FIG. 19 is a block diagram of the Bit Ripper depicted in FIG. 14.
Figure 20:
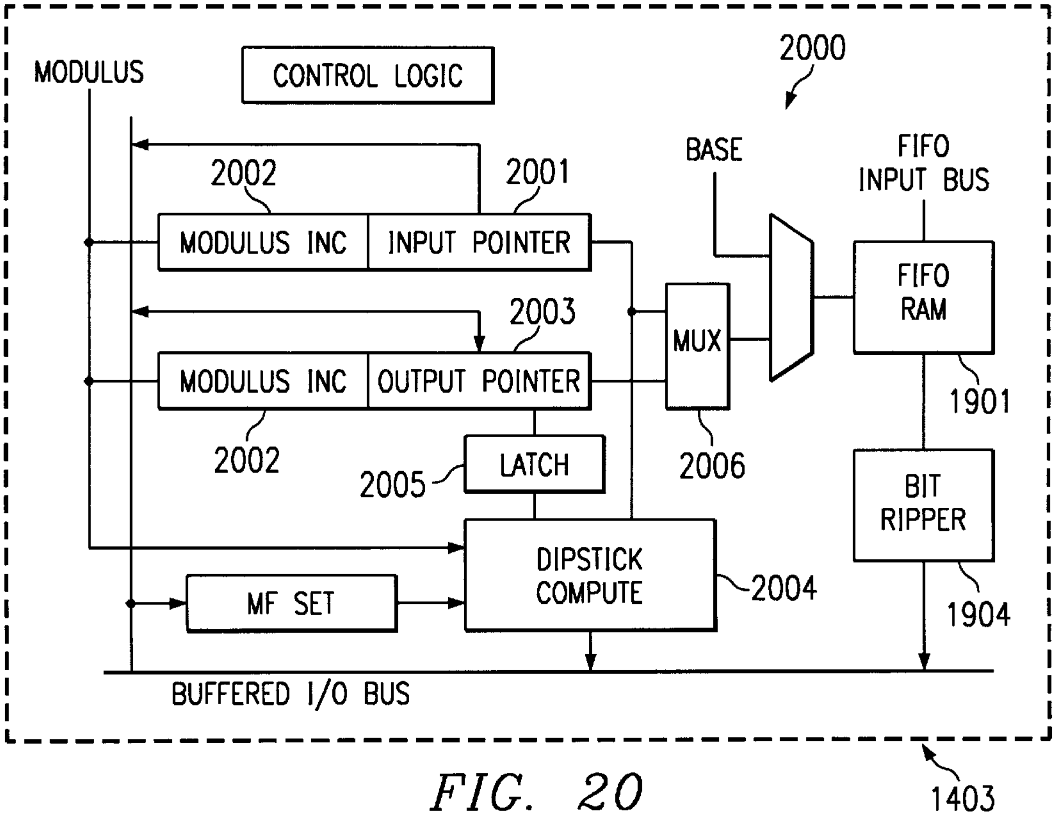
FIG. 20 is a detailed block diagram of a selected first-in-first-out (FIFO) of the dual FIFO unit shown in FIG. 14.

FIG. 19 is a block diagram of Bit Ripper 1900. The bit ripper allows the DSP to read a bit field from the FIFO RAM, where the bit field is right justified, of any width from 1 to 16 bits. This is useful in parsing Dolby AC-3, MPEG, or other serial bit streams composed of variable-width fields.

Bit Ripper 1903 includes a FIFO RAM 1901, NEWDATA register 1902, PDATA register 1903, BNEED 1904, Masker and shifter 1905, and BREMAIN register 1906.

Data from FIFO RAM 1901 feed the 16-bit NEWDATA register 1902, and then on into the PDATA (Previous Data) register 2043. The NEWDATA and PDATA registers form a data pipeline which feeds masker/shifter network 1905 that aligns and masks data read onto the I/O bus.

BREMAIN register 1906 holds a count of the bits remaining in PDATA register 1903, and is set to 16 when the first data word is copied from NEWDATA register 1902 to PDATA register 1903. In operation, the programmer sets BNEED register 1904 to the desired number of bits to be read to the I/O bus. If the value in BREMAIN register 1906 is greater than or equal to the value in BNEED register 1904, then data from PDATA register 1903 is shifted appropriately and read onto the I/O bus. If the value BREMAIN register 1906 is less than BNEED register 1903, the appropriate bits from the PDATA and NEWDATA registers are combined to produce the desired bit field on the I/O bus.

When data is read onto the I/O bus, the BREMAIN field is updated, and the PDATA and NEWDATA registers are updated as necessary. Note that while the BREMAIN and BNEED fields are 5-bits wide, only the values 0 through 16 are valid. FIG. 19 is a more detailed block diagram of a selected within dual FIFO unit 1403.

The DSP FIFO Input port accepts writes to I/O addresses, the same addresses used by the DSPs 200 for reading data from the FIFOs 1903. When data is written at this address, the low 16-bits of the 24-bit word are written into the selected FIFO. A one-instruction delay between writes is required.

Input FIFOs have a FIFO RAM 1901 of 4K by 16 bits, divided into two First-In First-Out buffers. FIFO RAM 1900 is read through Bit Ripper 1904, which positions bit fields on the I/O bus. Dual FIFO 1903 with Bit Ripper 1904 provides two channels of First-In, First-Out (FIFO) storage totaling 8K bytes. Data from each of the active Input Units 300 is written into a channel of FIFO 1903 for later processing by the DSPs 200. The two channels of FIFO, read through Bit Ripper 1904, allows DSPs 200 to read arbitrary length bit fields, from one to sixteen-bits long.

Each input FIFO has a readable Input Pointer 2001. When data to be written to the corresponding FIFO is available on the FIFO Input Bus, the address from Input Pointer 2001 is added to a base address of the corresponding FIFO in the common FIFO RAM 1901, to form an address in the RAM 1901 where the word is written. The Input Pointer is then incremented modulo a Modulus register 2002 that represents the size of the FIFO.

Multiplexer 2006 selects between the input and output pointers. When data is read from the FIFO 1901, it is read through bit ripper 1904 as described above. The value in Output Pointer 2003 is added to, and thus is relative to, the same Base as used with the Input Pointer of the FIFO. The value in Output Pointer 2003 is advanced, modulo the same Modulus in register 2002 as for the Input Pointer, as needed when words are read into the NEWDATA register of bit ripper 1903. While the funnel shifters and BNEED register of bit ripper 1903 are common to both FIFOs, there are separate PDATA, NEWDATA, State, and BRemaining registers for each FIFO. It is therefore possible to switch between reading the FIFO channels without having to reinitialize the data pipeline in the FIFO's Bit Ripper.

Input Pointer 2002 is readable and Output Pointer 2003 is both readable and writable. It is therefore possible to clear data from the FIFO by reading the input pointer and writing its contents to the output pointer. Output Pointer value enters dipstick logic 2004 through a latch 2005, which may either retain data or be transparent. Latch 2005 is under control of the OPTRFRZ (output pointer freeze) bit.

The OPTRFRZ bit permits the programmer to peek ahead in the FIFO at data that has not yet been completely processed. For example, should a program have detected a valid Dolby AC-3 header, and desire to verify that another header occurs at the indicated bit position in the FIFO, the program may set the OPTRFRZ bit. When set, this bit maintains the OV dipstick wall at current location to prevent data from being overwritten while the program repositions the output pointer to look for the next header. If the header is verified valid through presence of another header at the indicated position, the program may then restore the output pointer to the original position, drop the wall by clearing the OPTRFRZ bit, and resume processing the data.

When the OPTRFRZ bit is used to peek ahead in the FIFO, the following is the preferred sequence if the pointer is to be restored to the original location:

a. SET the OPTRFRZ bit;

b. Read the output pointer to be restored, modulo subtract 2 from it, and save in Temp1 (a first temporary register);

c. Read the BREMAIN value, subtract it from 16, and save in Temp2 (a second temporary register);

d. Write the value in output pointer register 2003 to the desired peek ahead location and peekahead read as needed;

e. To restore the FIFO state, copy Temp1 contents into output pointer register 2003 (the subtract repositions the pointer at the data to be read into the PDATA and NEWDATA registers); and f. Read Temp2 bits from the FIFO to reposition the BRemaining register.

Dipsticks, such as FIFO Empty, FIFO FULL, and FIFO Mostly Full (the MF bit) are computed by dipstick computer 2004 from the differences (modulo the pointer Modulus) between the latched Output Pointer and the Input Pointer. FIFO Empty occurs when the Output Pointer is equal to the Input Pointer and both the PDATA and NEWDATA registers are empty. FIFO FULL occurs when the Input Pointer is 3 less than the Output Pointer. FIFO Mostly Full occurs when, modulo Modulus, the difference (Input Pointer—Output Pointer) is more than a programmable MF Set value. This bit is intended to be used to throttle block transfers of data from a host computing system into the FIFO.

Note that the MFSet value is a 4-bit field set by the programmer, and zero extended to 12 bits. This means that the mostly full level, like the modulus, is only be set in 512 byte units. Because the Input Pointer and Output Pointer are readable, software may compute additional dipstick levels.

When FIFO FULL is detected, a sticky Overflow bit, the OV bit, is set. This bit once set remains set until cleared by a write of the bit to a zero. When the FIFO Empty is detected, filling of the NEWDATA and PDATA registers of Bit Ripper 1903 from the FIFO RAM 1901 is inhibited. The DAV (Data Available) bit is set when either both the NEWDATA and PDATA registers are full, or when the difference between the Input Pointer and the Output Pointer is greater than two.

Figure 21:
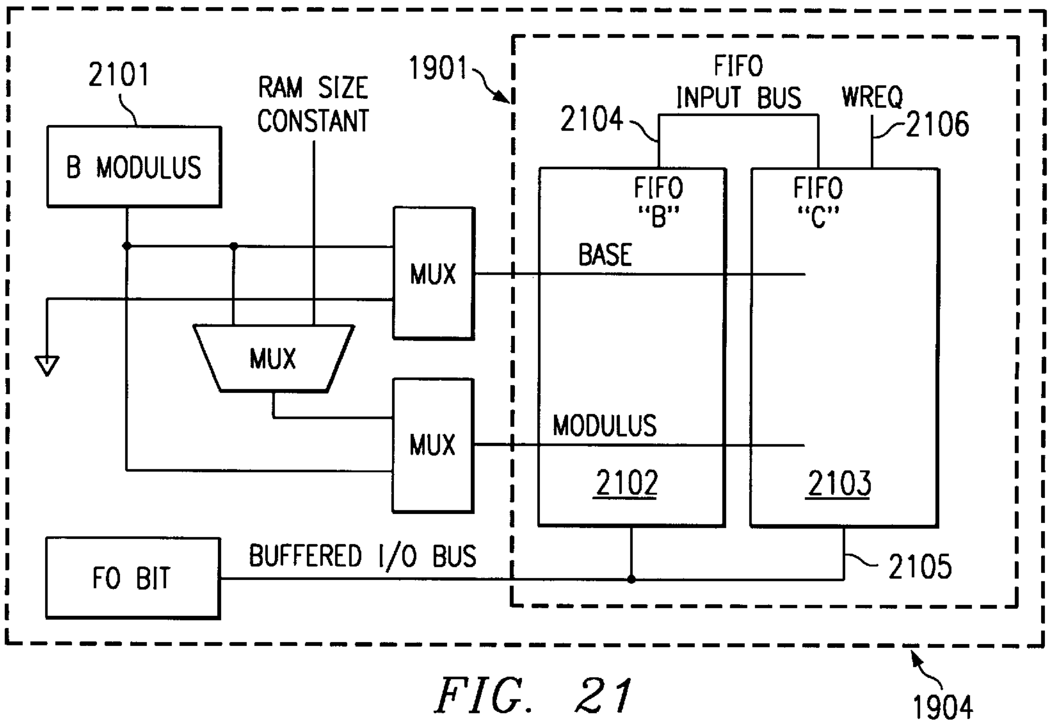
FIG. 21 is a diagram illustrating the sharing of FIFO RAM by two first-in-first-out registers (memories)
Figure 22:
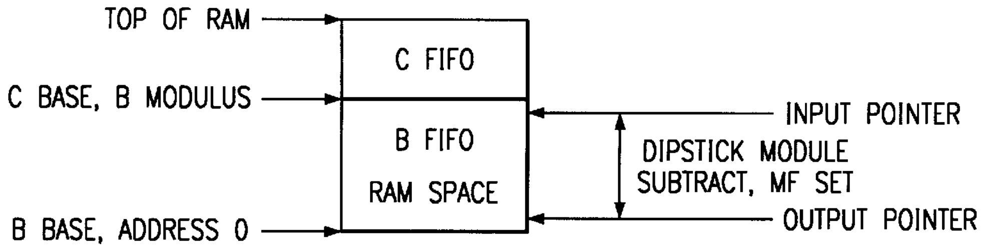
FIG. 22 is a diagram illustrating the allocation of RAM 1901 memory space between the dual FIFOs.

FIG. 21 is a conceptual diagram of dual FIFO 1904, illustrating the sharing of FIFO RAM 1901 by two first-in-first-out registers (memories). FIG. 22 illustrates the allocation of RAM 1901 memory space between the FIFOs.

The full Input FIFO Subsystem 1904 has two channels of FIFO within FIFO RAM 1901, with the FIFO bit selecting the active FIFO for reading, and a FIFO RAM allocation register, (FIFO B Modulus register 2101.) The value in the B Modulus register determines where the two FIFOs 2102 and 2103 labeled as the "B" FIFO and the "C" FIFO, are divided in the common 4K words of RAM. When FCSEZ=0, such that the "B" FIFO 2102 is active, the base address is selected to be a ZERO constant, while when FCSEZ=1, such that the "C" FIFO 2103 is active, the base address is selected to be the B Modulus. In order to conserve register and subtract bits, the 12-bit B modulus value derives its most significant five-bits from a programmable register, the least significant eight-bits bring a ZERO constant.

Similarly, when FIFO "B" is active, the Modulus is selected to be the B Modulus value in register 2101. When FIFO "C" is active, the Modulus is selected to be the size of the RAM minus the B Modulus value.

While only one FIFO is active for reading at any one time, according to the FCSEZ bit, either FIFO may be written at any time. FIFO input bus 2104 is common to both FIFOs B and C, as is a tri-state RAM data input-output bus 2105, and is time-shared between two FIFO input time slots and a pair of FIFO output time slots. FIFO input bus 2106 has an associated Write Request (WREQ) line 2106.

Figure 23:
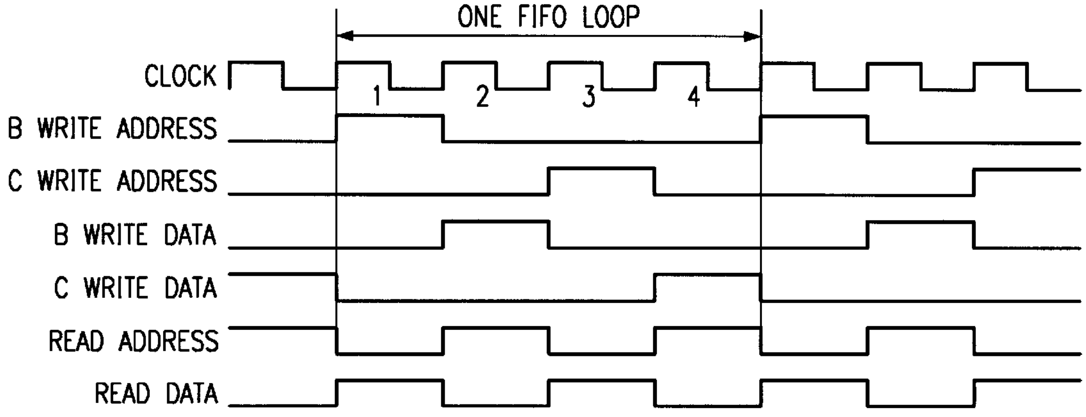
FIG. 23 is a diagram illustrating the pipelining of data through the dual FIFOs.

FIG. 23 is a timing diagram illustrating the pipelining of data through FIFOs B and C (2102 and 2103). In order to provide adequate time for the address computations (in particular, the dipsticking computation that must be completed in time to inhibit a write if the FIFO is full), a two-level pipeline is used in the FIFO system. In a first cycle, if the selected input unit places a write request on FIFO WREQ line 2106, the "B" channel input pointer is incremented and the "B" channel dipsticks are computed. Data are transferred over the FIFO input bus and written to memory in the following cycle. In a second cycle, while any FIFO "B" data is being written, the active output pointer is incremented, with the data read being transferred to the Bit Ripper NEWDATA register in the following cycle. In a third cycle, if the selected input unit places a write request on the FIFO WREQ line 2106, the "C" channel input pointer is incremented and the "C" channel dipsticks are computed. The data are transferred over the FIFO input bus and written to memory in the following cycle. In a fourth cycle, while any FIFO "C" data are being written, the active output pointer is incremented, with the data read being transferred to the Bit Ripper NEWDATA register in the following cycle. FIFO subsystem 1903 therefore may take one loop, or two instruction times, from the time that the FCSEL bit is changed to the time that data is present at Bit Ripper 1904 ready to be read.

Similarly, upon reading data through Bit Ripper 1904, new data will be ready to be read during the second instruction after a read.

In order to increase the test visibility of input unit 300, the following features are incorporated into I/O block 102. First, the DSP FIFO input port permits writing of an arbitrary pattern to the FIFO. Second, a selected DSP 200 may generate a pattern that is treated by the hardware as if it were a pattern on the inputs to the CDI or DAI port pins. Software generated S/PDIF, $I^2S$, or serial data patterns can test this hardware. Third, a DSP 200 may read the input pins to the DAI port and to the CDI port, allowing a quick verification of connectivity to these pins in a system, and also providing a parallel input port use for the 2 pins of the CDI port that are not used when this port is in S/PDIF mode.

Digital Audio Output (DAO) part 305 can transmit up to six channels of audio sample data in $I^2S$ compatible format. A block diagram of the DAO 305 port is provided in FIG. 24.

Digital Audio Output port 305 consists of a six-channel FIFO 2901 (DAODAT0–DAODAT5), three channel-configuration registers 2902 (DAOCFG1–DAOCFG3) and one port-control register 2903 (DAOCTL). Each FIFO can contain 32 words with a width of 20-bits. FIFO 2901 and registers communicate with DSPs 200 through a dedicated I/O bus 2904 and bus interface 2905. The outputs of six-channel FIFO 2901 are controlled by a multiplexer network 2906 which selectively pass data to audio output formatters 2907*a*–2907*b*. DAO 305 further includes a serial clock generator 2908 which generates clocks SCLK and LRCLK discussed below.

Port-control register 2903 specifies the clock ratios and allocates channels (DAODATA03–DAODATA5) to the three data output pins (AUDATA0–AUDATA3). Also, port-control register 2903 contains a FIFO word-counter, Half Empty flag, and Empty flag. Since all active audio channels run synchronously, channel 0 (DAODAT0) is assumed as the master FIFO channel. Hence, the FIFO status flags and "dipstick" represent the situation in the channel 0 FIFO.

Mux network 2906 provides flexibility in assigning FIFO channel data to output formatter blocks (AUD0–AUD2). AUD0 block 2907*a* can support up to six channels. However, the AUD1 (2907*a*) and AUD2 (2907*b*) blocks only carry two channels each. Therefore, the AUDATAx (described below) output pins can be configured in 6/0/0, 4/2/0, 4/0/2, and 2/2/2 channel data modes.

DAO port Control register 2903 is used to specify the clock ratios, channel configuration scheme, and monitors the FIFO 2903 status. It is read/writable except the fields FIFOCNT, HEMP, and EMPT, which are read-only. The TEST bit enables the FIFO test mode that allows access (write/read) to FIFOs 2901 for testing purposes.

The Channel Configuration Registers 2902 (DAOCFG1, DAOCFG2, DAOCFG3) correspond to three output data pins: AUDATA0, AUDATA1 and AUDATA2. They define the relations of each data pin vs. LRCLK and SCLK, respectively. The channel configuration fields provide a flexible mechanism for specifying the data output formats. The PREDLY field specifies the number of SCLK cycles to wait after an LRCLK edge before outputting sample data. The BITRES field specifies the number of bits per sample (up to 20) to be output and the INTERDLY field specifies the number of SCLK cycles to wait before outputting the next data sample. A typical output waveform is shown below in FIG. 30. Note that the INTERDLY field only applies to AUDATA0 channel, since the other outputs (AUDATA1 and AUDATA2) can only carry two channels. The channel control registers are read/writable.

DSPs 200 views each FIFO (DAODAT0 to DAODAT5) as an I/O registers one can write and read FIFO to perform first-in-first-out function for testing purpose when in test mode (TEST=1). DAO port 305 occupies ten IO register addresses and all ten registers are assumed to be allocated to one DSP 200 at a time. In the case of an I/O address contention within the DAO I/O address range, the DSPB operation will proceed, and the attempted DSPA operation will be ignored. Audio output port 305 communicates with an external DAC (not shown) through output pins AUTDAT0, AUDATA1, AUDATA2, and I/O pins MCLK, SCLK, and LRCLK (preferred pinouts are described below). When an external MCLK is provided, the port takes MCLK as input and generates within serial clock generation circuitry 2908 LRCLK and SCLK. In slave mode, an external SCLK and LRCLK are provided and the MCLK input is ignored. In master mode, DAO 305 uses the 512Fs/384Fs input from clock manager 1303 to generate all three clocks.

DAO port 305 can generate 4 interrupts: (1) FIFO half empty, when FIFOCNT (dipstick) decreases from 16 to 15; (2) FIFO empty, when FIFOCNT (dipstick) decreases from 1 to 0; (3) rising edge of LRCLK; and (4) falling edge of LRCLK.

The frequency of LRCLK is always equal to the audio sample rate(Fs). SCLK is the clock for serial output bit stream. Transitions of LRCLK can be aligned to either falling edge of SCLK or rising edge of SCLK by defining EDGE bit in register DAOCTL (2403). Also, data bits on pin AUDATAx are sent out after either the falling edge of SCLK or rising edge of SCLK according to EDGE bit. MCLK is the master clock for the external DAC. MCLK can be 512Fs, 384Fs, or 256Fs. SCLK can be 512Fs (only when MCLKRT=1), 256Fs, 128Fs, 64Fs, 48Fs, and 32Fs. Note that all combinations of clock rates are not available in some modes. AUDATA0, AUDATA1, AUDATA2 are low until OENs (output enables) are set and LRCLK and SCLK float until CLKEN is set. MCLK is always floating unless EXTMCLK=0 and CLKEN=1 (assuming clock generator 2908 provides MCLK and clocks are enabled).

To enable port 305, the CLKEN bit in the DAOCTL 2905 register and the appropriate OENs in each DAOCFGx (2902) register are set high. After port 305 is configured to the proper mode, about 1 to 2 FS periods of delay occurs until the port starts to send out data. During this delay period, MCLK/LRCLK/SCLK are generated and aligned properly. The CH0 sample is always sent out first through AUDATA1 pin in 6/0/0 configurations. In 2/2/2 configurations, CH0, CH2 and CH3 (channels 1, 2, and 3) samples are always sent out first through formatters 2907*a*–2907*c* (AUDATA1, AUDATA2 and AUDATA3); respectively.

The preferred startup sequence for DAO port 305 is as follows. First, reset the FIFO pointers and disable the clocks. Then disable the data outputs. Configure the channels as desired and fill the FIFOs 2901. Then set the output enables and clock enable begin transmitting data.

The CKTST bit in DAOCTL 2903 register is included for test purposes. When set, the CKTST bit causes the DSP Clock to be output on the MCLK pin. This allows monitoring of the PLL and clock manager circuitry for test and debug purposes. The CKTST bit should be cleared for normal operation.

Figure 24:
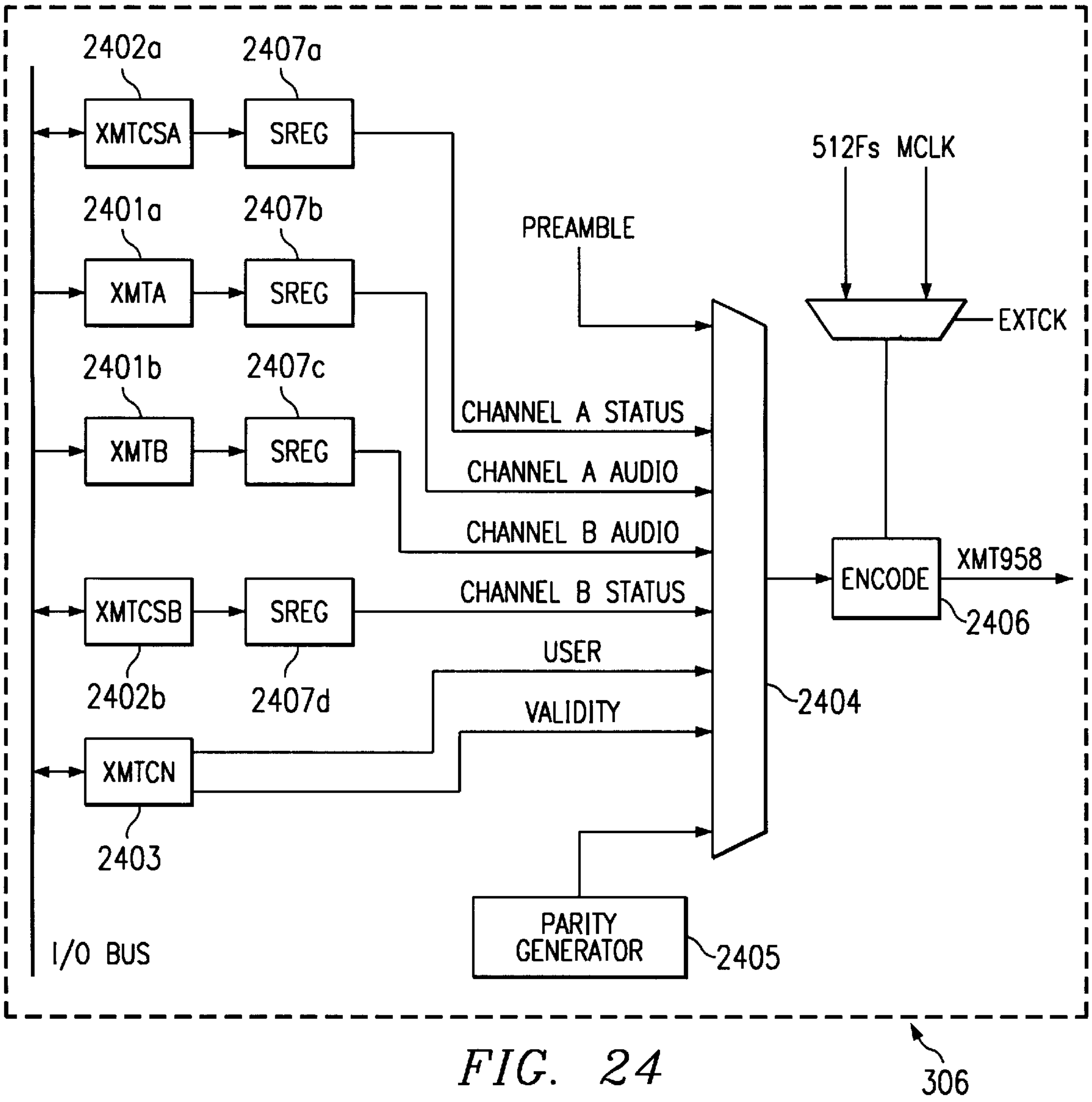
FIG. 24 is a block diagram of the data output (DAO) port.

FIG. 24 is a diagram of digital audio transmitter 306. The transmitter encodes digital audio data according to the Sony Phillips Digital Interface Format (S/PDIF), also known as IEC-958, or the AES/EBU interface format. The encoded data is output on the XMT958 pin.

Transmitter 306 has two FIFOs for audio data 2401*a* and 2401*b* (XMTA, XMTB), two 16-bit read/write registers for channel status data 2402*a* and 2402*b* (XMTCSA, XMTCSB), and a read/write control register 2403 (XMTCN). FIFOs 2401 are 24-bits wide and 32-words deep.

The audio and channel status data are read from their registers and multiplexed by a multiplexer 2404 with the validity and user bits from control register 2402, and the parity bit from parity generator. Preamble generation and biphase encoding to the S/PDIF format are handled automatically by encoder 2406. In all modes, the data in XMTA/XMTCSA and XMTB/XMTCSB registers correspond to Channels A and B of a S/PDIF encoded stream. This allows independent control over each channel, regardless of the type of data being transmitted.

Channel status data can be input in two different modes determined by the CSMD field in register XMTCN. In the first mode (CSMD=0), register XMTCSA (2402*a*) and register XMTCSB (2402*b*) store the 16 most important channel status bits for consumer audio data according to the S/PDIF standard. These are bits 0–5, 8–15, 24, and 25, defined as follows: Bit 0 must be low to divine the consumer format for the channel status; Bit 1 defines whether the information being transferred is audio or non-audio data; Bit 2 is the copy bit; Bits 3–5 are the emphasis bits; Bits 8–15 define the category code and whether the data is from an original or copied source; and Bits 24 and 25 define the sample frequency. XMTCS registers 2402 must be loaded once by the programmer and are read once per block by the transmitter. All other bits are transmitted as zero. The LSB of XMTCS registers is the LSB of the channel status bits.

The CBL status bit in XMTCN register 2403 goes high at a channel status block boundary and XMTCS registers are loaded into the corresponding shift register 2407 at the same time. CBL transitions low 64 subframes later.

In the second channel status mode (CSMD=1), all the bits in a data block can be controlled. The XMTCS registers 2402 are loaded every 32 subframes and are serially shifted by shift registers into 16 transmitted subframes for each channel (32 subframes total). This allows independent control of channel status data for both channels.

The BYTCK status bit (the channel status byte clock) in XMTCN register 2403 always transitions high at a block boundary. It is high for 16 subframes and low for 16 subframes, corresponding to one byte transmitted from each of the XMTCS registers 2402 during each phase of BYTCK. XMTCS registers 2402 are loaded into the corresponding shift registers 2407 by the transmitter at each rising edge of BYTCK.

Data from the XMT FIFOs 2401*a* and 2401*b* are loaded into the shift registers 2407*b* and 2407*c* of the transmitter at the sample rate specified in the clock manager. FIFOs 2401 can generate an interrupt to the given DSP 200 on half-empty and empty conditions. The validity (V) and user (U) bits in XMTCN register 2403 are read by the transmitter at the same time data from a XMT FIFO 2401 is read. These bits are transmitted with the audio data.

In describing the operation of the illustrated embodiment of decoder the following assumptions will be made to clarify the discussion:

(1) MPEG and AC-3 will always arrive only in the IEC61937 format (this implicitly means the data is word aligned);

(2) DTS can arrive in IEC61937, or LD (16-bit) and CD (14-bit) elementary formats. In all formats, including non-IEC61937, the data is word aligned;

(3) It will take almost T_autodetect=500 mS for the input stream to be detected and an appropriate response (play if possible, else report kind of stream) to occur;

(4) When switching out of a PCM track without a silence of at least T_silence=1000 mS will allow automatic detection of out-of-PCM and return the decoder 100 back in autodetect mode;

(5) If the PCM track changes within T_Silence=1000 ms to either IEC61937, DTS_LD or DTS_CD data then at most T_nonPCMdetect=500 mS of compressed data will be played out as garbage PCM before decoder 100 reverts to autodetect mode; and (6) No latency in playing PCM is allowed, apart from minimal (few samples) processing latency.

Figure 25A:
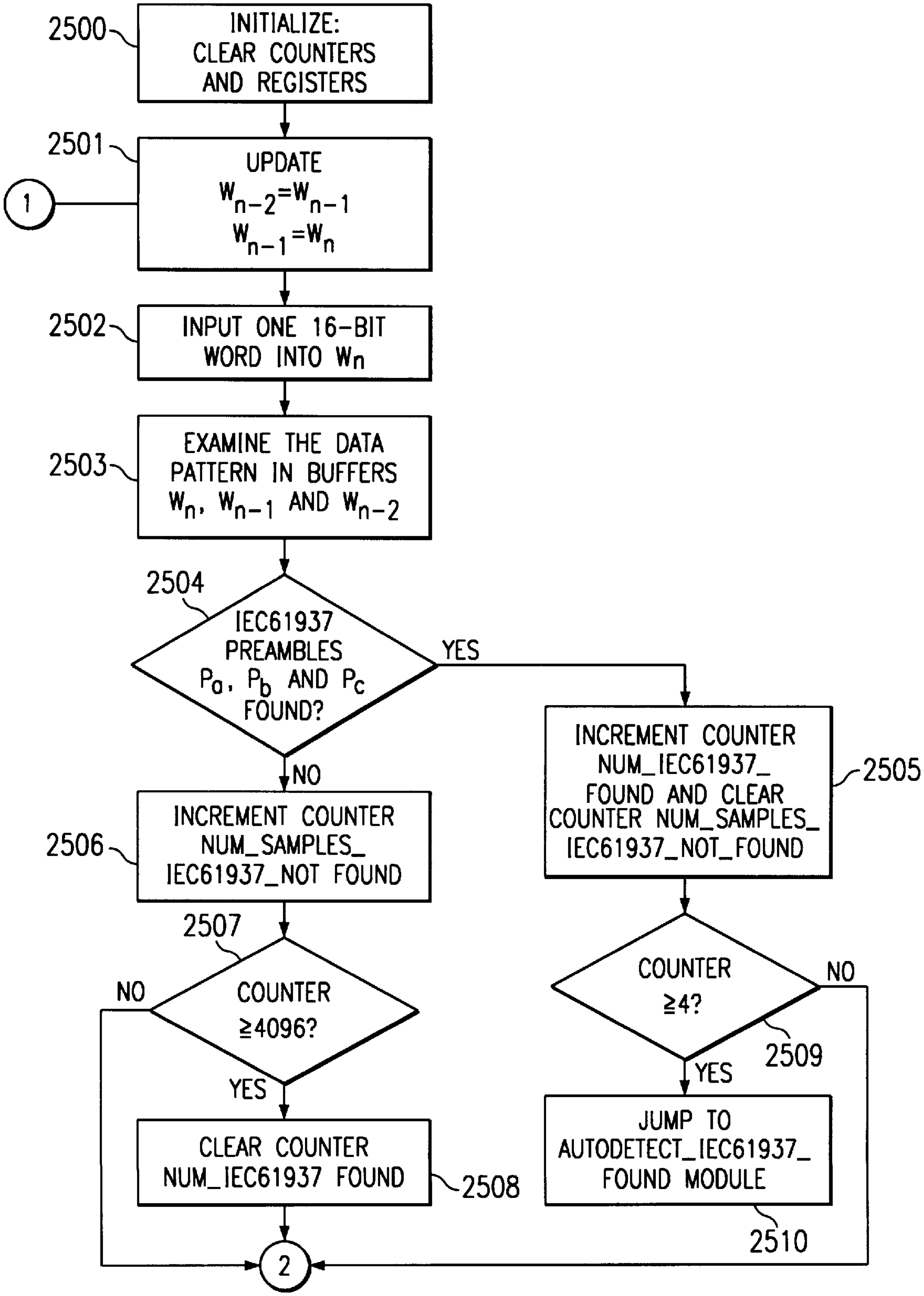
FIGS. 25A, 25B, and 25C are diagrams of the Autodetect Start-Up module.
Figure 25B:
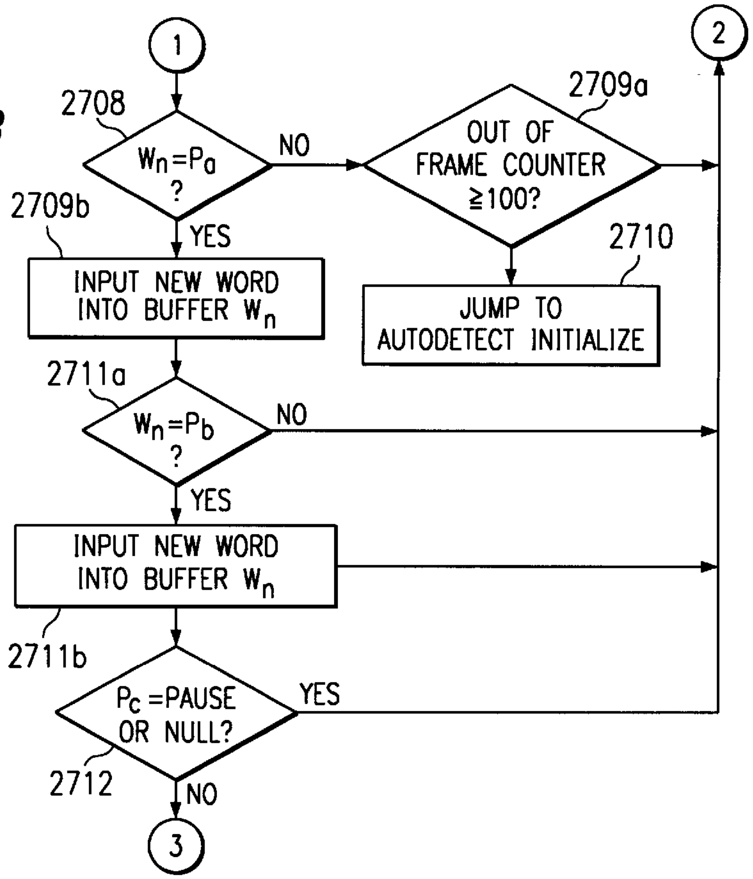
Figure 25C:
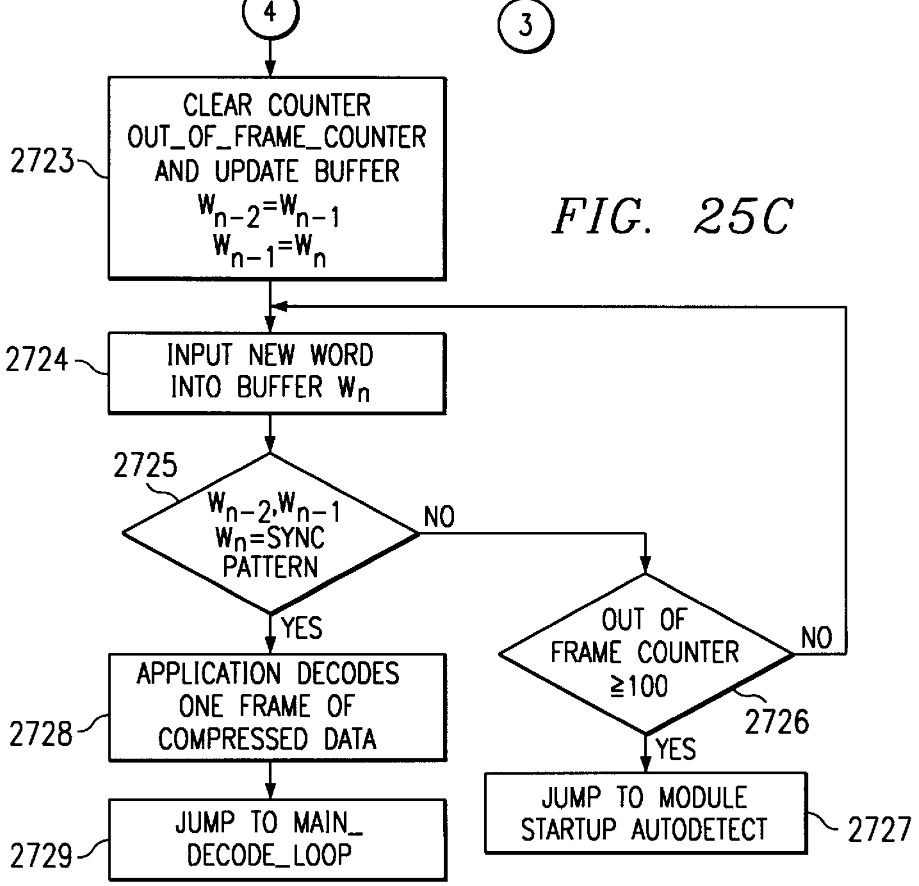

FIG. 25 is a block diagram of the Autodetect Start up module according to the principles of the present invention. Essentially, this module determines the format type of a data stream being input into decoder 100 at start-up. In the preferred embodiment, the Autodetect module can detect data in the IEC61937 format, the DTS_LD (laser disc) format, the DTS_CD (compact disc) format, or the linear PCM format. In addition to FIG. 25, the autodetect start module is also described in the pseudocode section 1.0 provided below.

At Step 2500, the counters and data buffers of the Start-up Autodetect module are cleared to zero. The pseudocode for Step 2500 is labeled 1.01. Specifically, the word buffers Wn-2, Wn-1 and Wn and counters NUM_AUTODETECT_LOOPS, NUM_IEC61937_FOUND, NUM_DTS_LD_FOUND, NUM_DTS_LD_FOUND, and NUM_DC_FOUND are all set to zero. Next, the buffers are updated such that Wn-2=Wn-1 and Wn-1=Wn at Step 2501.

At Step 2502, one 16-bit word is written into Buffer Wn. The previous contents of Buffer Wn-1 are then transferred to register Wn-2 and the contents of Buffer Wn transferred to buffer Wn-1. In other words, Register Wn holds the current data, Wn-1 the word received during the immediately preceding loop, and register Wn-2 holds the word input two loops previously. It should be noted that in the present discussion, the term "loop" will be used to designate the processing loop initiated as each new word written into register Wn. Step 2502 is described in the pseudocode section 1.2.1.

Next, the contents of buffers Wn-2, Wn-1 and Wn are examined to determine if they hold IEC69137 format preambles Pa, Pb, Pc, respectively (Step 2503). If this pattern is found; at Step 2504, then the counter NUM_IEC61937_FOUND is incremented at Step 2505 and NUM_SAMPLES_IEC61937_NOT_FOUND is cleared. Otherwise, if all three preambles are not found, then counter NUM_SAMPLES_IEC61937_NOT_FOUND is incremented (Step 2506).

If the counter value in NUM_SAMPLES_IEC61937_NOT_FOUND is greater than or equal to 4096 (Step 2507), the conclusion is that IEC61937 formatted data has not been found in the data stream: counter NUM_IEC61937_FOUND is cleared at Step 2508 and the autodetection process continues to search for other data type identifiers. If, however, the value in counter NUM IEC61937 FOUND reaches 4 at Step 2509 before counter NUM_SAMPLES_IEC61937_NOT_FOUND reaches 4096, then the conclusion is that IEC61937 data has been found and a jump is made to the AUTODETECT_IEC61937_FOUND module at Step 2510 (discussed later). Steps 2503–2510 also represented in pseudocode section 1.2.1.

In the event that data in the IEC61937 format is not found, the autodetect module then searches for data in the DTS__LD (laser disc) format. This test is described in Section 1.2.2 of the pseudocode. In general, it works similarly to the IEC61937 detection procedure.

When, at Step 2511, the two sync words carried by a frame of DTS__LD data are found in buffers Wn-1 and Wn, counter NUM DTS LD FOUND is incremented at Step 2512 and NUM__SAMPLES__DTS__LD__NOT__FOUND is cleared, otherwise counter NUM__SAMPLES__DTS__LD__NOT__FOUND is incremented at Step 2513. Then, if at Step 2514, the DTS__LD sync word pattern has been detected six times (Step 2514) before counter NUM__SAMPLES__DTS__LD__NOT__FOUND reaches 4096, then a branch of the AUTODETECT__DTS__LD__FOUND module occurs at Step 2515. If counter NUM__SAMPLES__DTS__NOT__FOUND reaches 4096 first, then counter NUM__DTS__LD__FOUND is cleared and the detection procedure continues at Step 2518. In the third possibility, if counter NUM__DTS__LD__FOUND has yet to reach six and the value in counter NUM__SAMPLES__DTS__LD__NOT__FOUND has not reached 4096, the detection procedure jumps to Step 2518 and on to the next test, which is for DTS__CD data.

The test for a DTS CD test is also described in the pseudocode section 1.2.3. and again is similar to those discussed above.

At Step 2518 a determination is made as to whether buffers Wn-1 and Wn contain the sync words used in the DTS CD format. If the sync words are found, counter NUM__DTS__CD__FOUND is incremented and NUM__SAMPLES__DTS__LD__NOT__FOUND is cleared at Step 2519 otherwise, counter NUM__SAMPLES__DTS__CD__NOT__FOUND is incremented at Step 2522. If the value in counter NUM__DTS__CD__FOUND reaches six before the value in counter NUM__SAMPLES__DTS__CD__NOT__FOUND reaches 4096, at Step 2521, then jump is made to the AUTODETECT__DTS__CD__FOUND module (discussed below). When the number of loops in which the DTS__LD sync words have not been found reaches 4096 first (Step 2524), then the last test of the autodetect module, for PCM data, takes place starting at Step 2526. If neither counter has reached its defined maximum value, then processing also jumps to the start of the DC data at Step 2526.

If after examining sufficient data, neither IEC61937, DTS__LD nor DTS__CD data are found, then it is assumed that data being input to decoder 100 is linear PCM data. However, before jumping to the PCM routine, a test is made to determine whether the data source is in a pause or similar silent mode and outputing only data constants (DC). Pseudocode section 1.2.4 describes this operation.

When data constants are being received, the values in the data buffers will all be the same. Therefore, at Step 2526, the contents of buffers Wn-1 and Wn are compared. When the contents of Wn-1 and Wn are equal, the counter NUM__DC__FOUND is incremented at Step 2528. Otherwise, the counter is cleared at Step 2527.

The value in counter NUM__DC__FOUND is used in turn to increment or clear counter NUM__AUTODETECT__LOOPS. Specifically, at Step 2532 a determination is made as to whether the value in counter NUM DC FOUND is greater than or equal to 4096. If it is, then counter NUM__AUTODETECT__LOOPS is cleared at Step 2533. In either case, processing returns to wait for a new word at Step 2501.

When Wn-1 does not equal Wn at Step 2526, at Step 2527 counter NUM__DC__FOUND is cleared and counter NUM__AUTODETECT__LOOP is incremented at Step 2529. Then, at Step 2530, a determination is made as to whether the count in counter NUM__AUTODETECT__LOOPS is greater than or equal to 28,670. If the value in counter NUM__AUTODETECT__LOOPS is greater than 28670, one can safely assume that the data is PCM data rather than constants. In this case, a jump is made to AUTODETECT__PCM__FOUND module at Step 2531. If the NUM__AUTODETECT__LOOPS counter value is not greater than or equal to 28,670 then a detection process loops back to Step 2501 and waits for the next word.

Figure 26:
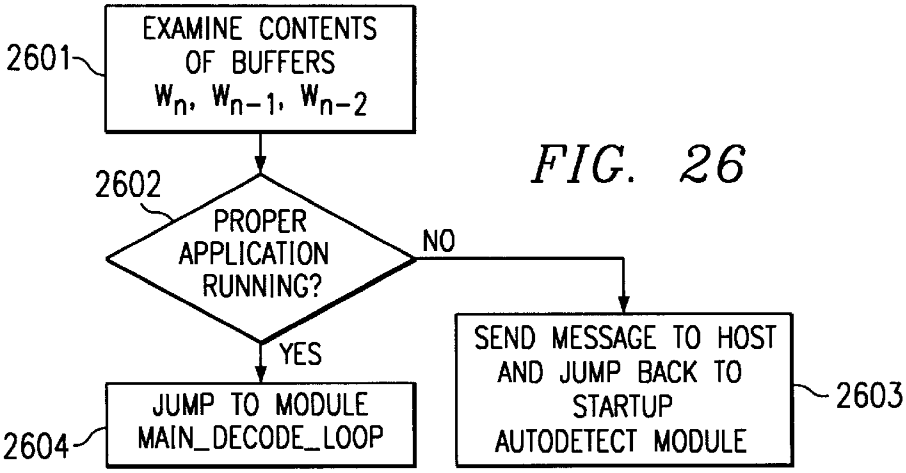
FIG. 26 is a diagram of an exemplary post-audiodetection module.

FIG. 26 depicts generally the operation of the AUTODETECT__DTS__LD FOUND, AUTODETECT__DTS__CD__FOUND, AUTODETECT PCM__FOUND and AUTODETECT__IEC61937__FOUND modules. The goal is essentially the same in each case: to determine whether the applications program being run is capable of processing the now-identified data being input into decoder 100. This procedure is the same in each case, with the specific details shown in pseudocode sections 2.1–2.4.

A check is made to identify the applications program. (See Step 2602). If the input type and the applications program are compatible, a jump is made to the MAIN__DECODE__LOOP module at Step 2604. If not, decoder 100 sends a message at Step 2603 to the host and reenters startup autodetect. The host, if able, can then download the proper application software to decoder 100.

Once the appropriate decoder application for the input bitstream has been downloaded and enabled, the decoder decodes the input bitstream and generates audio output, while simultaneously monitoring the input stream for any change in stream content.

The method for detecting change is employed during the sync search phase when the decoder 100 is waiting for the next compressed data frame, i.e. the decoder is between frames. In this inter-frame state, the decoder is not necessarily out-of-sync, since the decoder may simply have decoded the previous frame ahead of time, and could be awaiting the arrival of the next frame. Thus, this state is referred to as "out-of-frame". This is not necessarily out-of-sync, but a prolonged stay in this state leads to an out-of-sync condition.

A timer-based reset mechanism triggers the out-of-sync state if too much time has elapsed in the out-of-frame state. Once the out-of-sync state is triggered, the decoder 100 reverts to the Startup Autodetect mode discussed above.

Figure 27A:
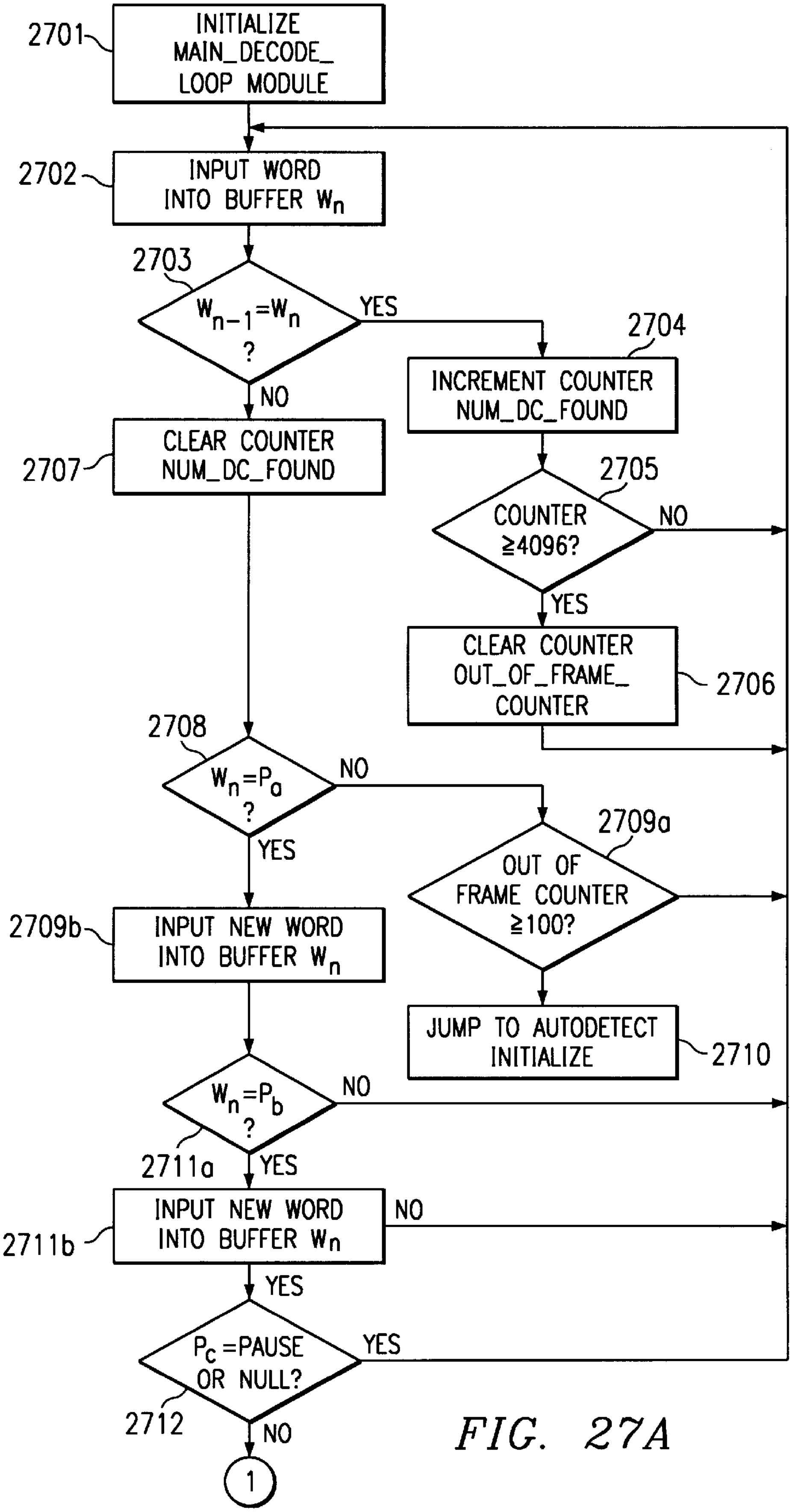
FIGS. 27*a,* 27*b* and 27*c* are diagrams of the operation of the Main Decode Loop.
Figure 27B:
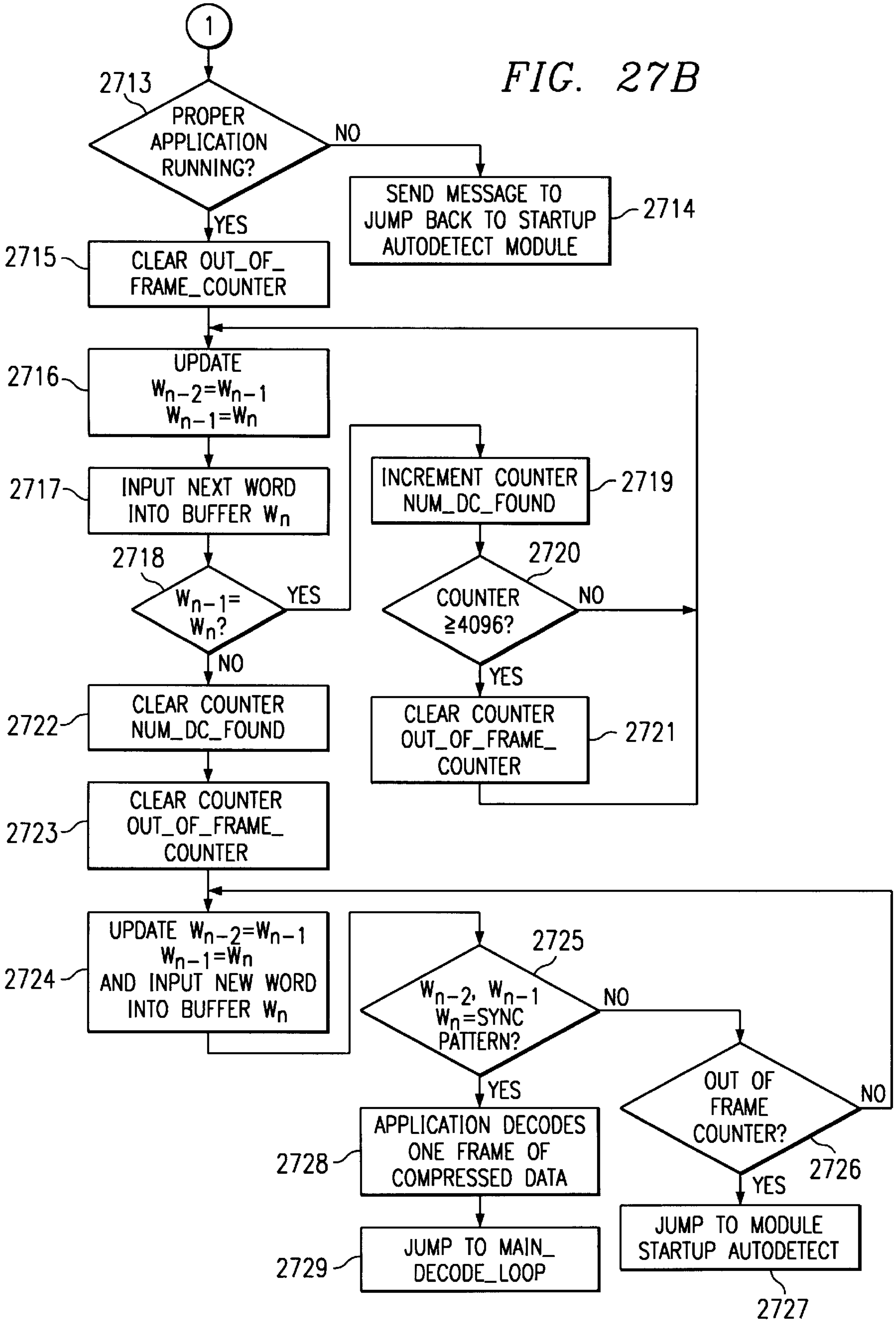

FIG. 27 and Section 3 of the pseudocode describe the first module (MAIN__DECODE__LOOP). Initialization takes place at Step 2701 where the parsing function of decoder 100 is enabled and counter OUT OF FRAME COUNTER is cleared to zero (pseudocode Sections 3.1.1 and 3.1.2). The system then waits for a new dataword and stores it in buffer Wn at Step 2702.

During runtime, it is necessary to determine whether a pause or out-of-frame condition has occurred and therefore decoder 100 is only receiving a stream of data constants. This procedure is similar to the data constants test described above. In FIG. 27, the data constants check is shown at Steps 2703–2707.

Each time a data constant is received, the values in buffers Wn-1 and Wn match (Step 2703). In this case, the counter NUM__DC__FOUND is incremented at Step 2704. If and when the count in counter NUM__DC__FOUND reaches 4096 (Step 2705) then the OUT__OF__FRAME__COUNTER is cleared. (Step 2706). This counter is used to measure elapsed time as discussed immediately below. After that, the routine returns to Step 2702 in anticipation of the next data word.

If the contents of registers Wn-1 and Wn do not match at Step 2703, then counter NUM_DC_FOUND is cleared on the conclusion that non-constant data is currently being input. Hence, the process can then continue with a test for IEC 61937 data.

The test for IEC61937 proceeds as follows. If the value now stored in buffer Wn is not the Pa preamble of an IEC61937 format frame, then a determination is made at Step 2709*a* as to whether the value in the OUT_OF_FRAME_COUNTER is greater than or equal to 100. Specifically, the out of frame counter counts time, as driven by the timer module, rather than words. A counter value greater than 100 indicates that a 100 mS time interval has passed without a Pa preamble. If it has, an assumption is made that too much time has lapsed in an out-of-frame state and therefore decoder 100 may be in an out-of-sync condition. Therefore, at Step 2710 the routine jumps to the STARTUP AUTODETECT procedure described in FIG. 25 at Step 2710. However, if this counter does not indicate a timeout, processing loops back to Step 2702 in anticipation of the next word in the datastream.

When a preamble Pa is found, a new word is input into buffer Wn and 2709*b*. The next task is to determine whether the next word received is the second IEC61937 preamble, Pb. (Step 2711) If the preamble Pb is not found, then processing loops back to Step 2702 to wait for the next word. If however, the preamble Pb is found, then a new word is input into buffer Wn at Step 2711*b* and the processing simply continues to Step 2712.

If IEC61937 data is being received the next word should be the Pc preamble. At Step 2712, a test is therefore made to determine if the Pc preamble indicates a null or pause, and if it does, processing again loops back to Step 2702. If not, then the preamble is tested to determine whether it matches the Pc preamble expected by the current running application (Step 2713). If they do not match, then an error has occurred and the running application is incompatible with incoming data stream. If this happens, at Step 2714 a message is sent to the host, and decoder 100 reenters startup autodetect. The host can then download to decoder 100 the proper application software, as necessary.

At this point, assuming that the proper application is running, a search is initiated for the sync words carried with the compressed data itself (i.e. MPEG, DTS, etc.). This test is applicable for either the case where the compressed data is traveling in the IEC61937 format, or on its own. The pseudocode for these routines are found in Section 3.1.4 and 3.15.

First, the out-of-frame counter is cleared at Step 2715 and registers updated such that Wn-2=Wn-1 and Wn-1=Wn. Decoder 100 now waits for the next word of data.

The data is received and input into buffer Wn at Step 2717. Next, a test is made to determine whether received data is a stream of constants (i.e., an out-of-frame condition). Every time the contents of Wn-1 are equivalent to the contents of Wn, the counter NUM DC FOUND is incremented at Step 2719. As long as the value in the counter is below 1,000 (Step 2720), a processing loops back to Step 2717 in anticipation of the next word. If however, the value in the counter reaches 4096 at Step 2720, then counter OUT_OF_FRAME_COUNTER is cleared at Step 2721. Each time the data changes between loop Wn-1 and Loop Wn, it is assumed that non-constant data is now being received. In this case, the NUM_DC_FOUND counter can be cleared at Step 2722.

Next, the OUT_OF_FRAME_COUNTER is cleared and the buffers updated such that Wn-2=Wn-1 and Wn-1=Wn. A new word is input into buffer Wn at Step 2724. A test then is run to ensure that the proper sync pattern has been stored in buffers Wn-2, Wn-1, Wn, whether embedded in the IEC61937 format or otherwise. This is done at Step 2725 by examining the contents of buffers Wn-2, Wn-1 and Wn to determine if the expected two or three word sync patterns are stored there. If not, a determination must first be made as to whether the main decode loop routine has timed out. This check is made at Step 2726 by determining if the out-of-frame counter value has reached 100. Recall that the frame counter is incremented by the timer module as purely a function of time. If the count has reached 100, decoder 100 may be out-of-sync and a jump is made back to the Start-Up AUTODETECT INITIALIZE module of FIG. 25 (Step 2727). Otherwise, a jump is made back to Step 2724, for the input of the next word into buffer 2724 at Step 2726.

When the sync pattern stored in buffer Wn-2, Wn-1 and Wn is correct for the expected data type, then the application software proceeds at Step 2728 to decode corresponding single frame of compressed data. When decompression of the frame is complete, the processing jumps back to a MAIN_DECODE_LOOP routine at Step 2729.

Figure 28A:
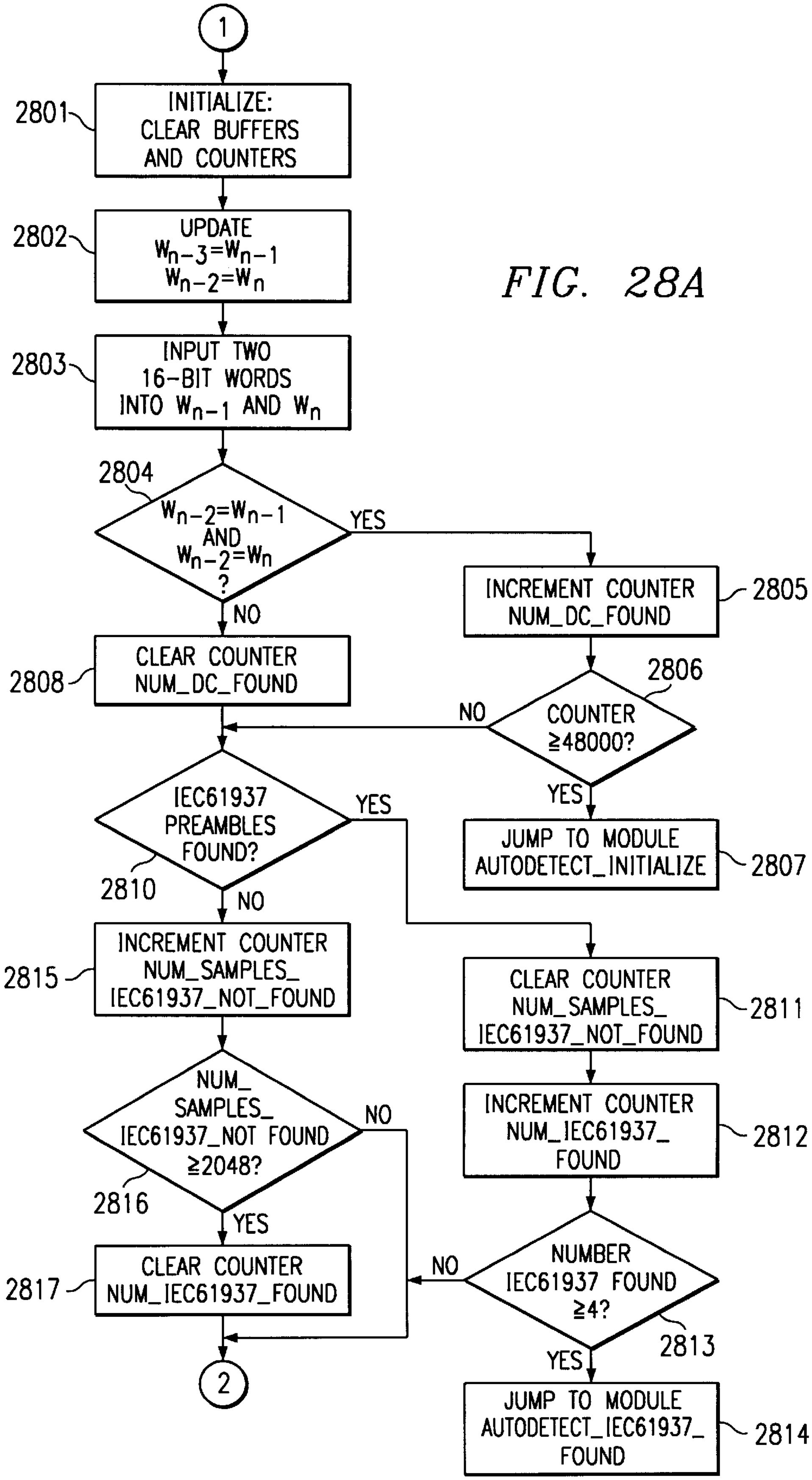
FIGS. 28*a,* 28*b* and 28*c* are diagrams of the operation of the runtime autodetect module for linear PCM.
Figure 28B:
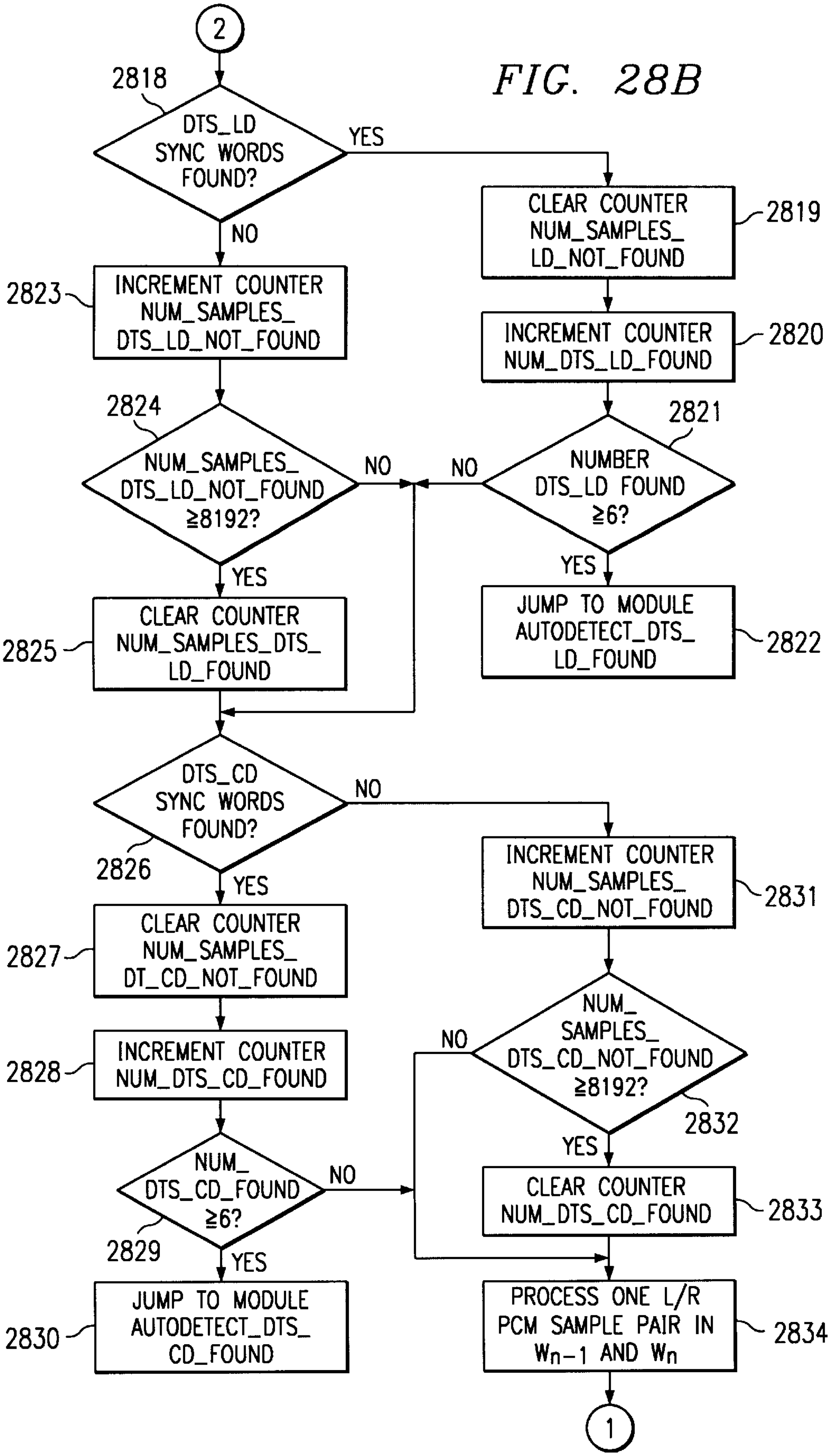

FIG. 28 is a flow diagram describing the method for automatically detecting the change of data format when in linear PCM during run time. Pseudocode Section 4.0 corresponds to this method.

Section 4.0 of the pseudocode and FIG. 28 describe a scheme utilized to detect a change in a Linear PCM input bitstream at runtime. Generally, in this scheme, the downloaded PCM application software processes input stereo PCM in a normal fashion while simultaneously monitoring the bitstream for silence (DC) as well as for certain sync patterns, to detect a change in input data type.

When a prolonged silence occurs (more than 1000 mS), this marks an out-of-PCM condition, and decoder 100 reverts to the autodetect state (FIG. 25). In case this silence indicates an actual transition to a new kind of (non-PCM) input stream, the new input will be autodetected and an appropriate response sent to the host which can download the necessary application, if necessary. If the input stream is still PCM (for example, due to a change of track on a CD player), then at most 500 mS later, PCM processing resumes. Typically, this loss of input data is not a problem since transitioning out of silence is in any case a ramp up in a PCM track.

On the other hand, there is also the case where there is no (or less than 1000 mS) silence between the end of PCM data and the arrival of new compressed data. With the above scheme in place, decoder 100 would never detect a non-PCM input and thus would indefinitely play out harsh compressed data as PCM audio. In order to make decoder 100 robust to this situation, an additional search for IEC61937, DTS_LD, and DTS_CD sync patterns is also undertaken simultaneous to playback. The smallest possible unit of compressed data is a 4096-sample DTS frame (AC3=1536 and MPEG=1152 samples), which corresponds to 94.0 mS at 44.1 KHz. For good confidence, a wait period of at least 6 DTS sync patterns is taken before declaring out-of-PCM and triggering autodetection. As before, the wait for DTS_LD/CD versus IEC61937 is offset by two to ensure proper detection of IEC61937 containing DTS.

The above wait period leads to worst-case approximately 500 mS transition time from PCM to be new data if the unannounced new stream were 44.1 KHz DTS (like coming out of a LD). Thus, in the case of no silence between transitions, the user may hear approximately 500 mS of harsh compressed audio played out as PCM before decoder 100 autodetects the input format.

At Step 2801, the system is initialized. Among other things, the four data buffers Wn-3, Wn-2, Wn-1 and Wn along with the counters used in this procedure, clear to zero. These counters are more completely specified in Section 4.1.1 of the pseudocode.

After initialization, the buffers are updated at Step 2802 and then data is input and stored in the data buffers in Step 2803. Unlike the procedures discussed above, in this case two 16-bit words are input at a time and stored in buffers Wn-2 and Wn The detection of a pause or silent period specifically operates as follows. When Wn-2=Wn-1 and Wn-2=Wn, at Step 2804, it is evident that at least two right channel words and two left channel words are all the same which may indicate a pause or silent period where only constants are being received by decoder 100. To obtain a reasonable number of samples to confirm this is the case, counter NUM_DC_FOUND is incremented at Step 2805. This counter keeps a running total of the number of identical words continuously input. At Step 2807 a test is made to determine if the counter value is greater than or equal to 48,000. If it is not, then the processing loops back to Step 2801 wherein two more 16-bit words of data are input. On the other hand, if the counter value exceeds 48,000, decoder 100 concludes that it is in fact receiving a stream of data constants, and therefore jumps (Step 2807) back to module START_UP AUTODETECT as shown in FIG. 25.

If within the time window defined by 48,000 counts in the NUM_DC_FOUND counter, the data in at least one buffer differ from that stored in its corresponding buffer (i.e., Wn≠Wn-2), then the counter is cleared at Step 2808. Decoder 100 next proceeds to check to determine if the incoming data stream is in the IEC61937 data format.

The check for IEC61937 formatted data is described in steps 2810–2817 and pseudocode section 4.1.4.

Each time an IEC61937 preamble is found at Step 2810, the counter NUM_SAMPLES_IEC61937_NOT_FOUND is cleared and the counter NUM_IEC61937_FOUND is incremented (Steps 2811 and 2812). When four or more IEC61937 preambles are found (Step 2813), then processing jumps to module AUTODETECT_IEC61937_FOUND on the conclusion that the received data is IEC61937 data (Step 2814). If the number of preambles that have been found is less than four, the next test to be performed (for DTS_LD data) on the data in buffers Wn-3, Wn-2, Wn-1 and Wn takes place.

Each time that a sample is received that is not identified as a IEC61937 preamble, counter NUM_SAMPLES_IEC61937_NOT_FOUND is incremented (Steps 2815). When 2048 consecutive word pairs which are not IEC61937 preambles are detected, then the counter NUM_SAMPLES_IEC61937 FOUND is cleared and the check for DTS_LD data begins. If the number of word pairs of non-IEC61937 data is less than 2048, then processing directly proceeds to the DTS_LD test.

The test for DTS_LD data is similar to those described above. Each time a DTS_LD sync word is found (Step 2818) then counter NUM_SAMPLES_DTS_LD_NOT_FOUND is cleared (Step 2819) and the counter NUM_DTS_LD_FOUND is incremented (Step 2820). At Step 2821, if the number of DTS_LD_FOUND is greater than or equal to six, then a jump is made to module AUTODETECT_DTS_LD_FOUND at Step 2822, otherwise the processing jumps forward to the DTS_CD test.

Each time a word pair is received which is not a DTS_LD sync word, then counter NUM_SAMPLES_DTS_LD_NOT_FOUND increments (Step 2823). When the count in this counter reaches 8192 at Step 2824, then the counter NUM_DTS_LD_FOUND is cleared and processing moves on to the test for DTS_LD data. When counter NUM_SAMPLES_DTS_LD_NOT_FOUND has not reached 8192, then counter NUM_SAMPLES_DTS_LD_FOUND is cleared at Step 2825, and processing directly jumps to the DTS_CD test.

The check for DTS CD data begins at Step 2826 where a test of the buffers is made for DTS_CD sync words. If DTS CD sync words are found, then the counter NUM DTS SAMPLES CD NOT FOUND is cleared and counter NUM_DTS_CD_FOUND increments (Steps 2827 and 2828). If at Step 2829, the count in counter NUM_DTS_FOUND reaches six, then at Step 2829 a jump is made to module AUTODETECT_DTS_CD_FOUND to initiate the processing of DTS CD data. If however, the counter does not reach six, at Step 2829, then the routine jumps ahead to Step 2834, and the one pair of left and right PCM samples in buffers Wn-1 and Wn is processed.

If DTS_CD sync words are found at Step 2826, then the counter NUM SAMPLES_DTS_CD_NOT_FOUND increments (Step 2831). When the value in this counter meets or exceeds 8192, then counter NUM DTS CD FOUND is cleared (Steps 2832 and 2833). A PCM sample pair is then processed (Step 2834). If not, processing goes directly to Step 2834.

EXEMPLARY PSEUDOCODE 1.0 STARTUP AUTODETECT MODULE 1.1 Autodetect Initialize

Assumed to be on the correct FIFO (FB for compressed data decoders and FC for PCM applications), and also that Freeze bit is OFF for the appropriate FIFO.*/

Switch off Header Finder in CCR. /*This allows all data into the FIFO, not only IEC61937 bursts.*/ if (BSTOP-BSTART)==14 then {set BSTART-=2. /*This will happen when re-entering autodetect state after decoding non-IEC61937 DTS 14-bit format.*/} if (BSTOP-BSTART)==24 then

{set BSTOP-=8/ /*This will happen when re-entering autodetect state after playing PCM*/}

/*NOTE: Above 3 cases are mutually exclusive and can happen only with certain applications. Thus, some of the above code can be removed in irrelevant cases for optimization.*/ Initialize the following to zero: Num_Autodetect_Loops, Num_IEC61937_Found, Num_DTS_LD_Found, Num_DTS_CD_Found, Num_DC_Found.

Wn-2, Wn-1, Wn /* 3-word data buffer*/

1.2 Autodetect_Loop

/*Ensured here that input port associated with this application is in 16-bit mode, that (BSTOP-BSTART==16) and that Header Finder is disabled*/

Wn-2=Wn-1;

Wn-l=Wn;

Wait for input data and get one 16-bit word from FDATA into Wn.

1.2.1 Update Num_IEC61937_Found and branch if IEC61937

If (Wn-2==0×f872(Pa) and Wn-1==0×4e1f(Pb) and Wn&0×1f!=0×0(Null Pc) and Wn&0×1f!-0×3(Pause Pc) then {Num Samples IEC61937 Not Found=0

Num_IEC61937_Found++;

if (NUM_IEC61937_Found>=2) then

{jmp Autodetect_IEC61937_Found.

/* NOTE: No check here to see if the same Pc is found consecutively. This can be added later if required.*/}} else

{Num_Samples_IEC61937_Not_Found ++; if(Num_Samples_IEC61937_Not_Found>4096) then {/*Time window elapsed*/

Num_IEC61937_Found=Num_Samples_IEC61937_Not_Fou nd=0;}}

1.2.2 Update Num_DTS_LD_Found and branch if DTS_LD

If (Wn-1==0×7ffe and Wn==0×8001) then

{Num_Samples_DTS_LD_Not_Found=0 Num DTS LD Found++; If (Num_DTS_LD_Found >=6) then {Jmp Autodetect DTS LD Found.

/* NOTE: even in the case of DTS within IEC61937, it is impossible for 6 DTS sync words to arrive before 4 IEC61937 frames, therefore the case of DTS within IEC61937 will be detected as IEC61937 above. This precludes the false decision that the stream is DTS_LD, irrespective of when the autodetect analysis began with respect to the stream. */}} else

{NUM_SAMPLES_DTS_LD_NOT_FOUND++; if(NUM_SAMPLES_DTS_LD_NOT_FOUND>16384)then {/*Time window elapsed*/ NUM_DTS_LD_FOUND=NUM_SAMPLES_DTS_LD_NOT_FOUND=0 }}

1.2.3 Update Num DTS_CD_Found and branch if DTS_CD

If (Wn-2==0×1fff and Wn-1==0×e800 and Wn&0×fc00==0×0400) then

{Num_Samples_DTS_CD_Not_Found=0;

Num_DTS CD Found++;

If (Num_DTS_CD_Found >=6) then {jmp Autodetect_DTS_CD_Found. /*DTS_CD cannot be confused for DTS in IEC61937 since it has a different sync pattern (14-bit versus 16-bit*/}} else

{NUM_SAMPLES_DTS_CD_NOT_FOUND++; if (NUM_SAMPLES_DTS_CD_NOT_FOUND>16384) then {/*Time window elapsed*/ NUM_DTS_CD_FOUND=NUM_SAMPLES_DTS_CD_NOT_FOUND=0; }}

1.2.4 Update Num_DC_Found

If (Wn-1==Wn) then

{Num_DC_Found++;} else

{Num_DC_Found=0;}

1.2.5 Update Num Autodetect_Loops and branch if PCM

If (Num_DC_Found>4096) then

{/*We should receive some non-zero data within a 4096 word window if we are receiving compressed data. If not this silence should be ignored.*/

Num_Autodetect_Loops=0;

NUM_DC_FOUND=4096; /*Saturate here till zeroed out by non-DC input*/} else

{Num_Autodetect_Loops=++;

If (Num_Autodetect_Loops>=28670) then {jmp Autodetect_PCM_Found.

/*Worst case is 4095 words of silence followed by the last 4095 words of a partial DTS frame (1 word missing) and then 6 DTS frames of 4096 words each. So we have to allow for at least 28670 words of valid data to be parsed before deciding on PCM*/}}

1.2.6 jmp AUTODETECT_LOOP 2.0 POST AUTODETECT

Once autodetect has decided on a stream type as discussed in Section 1.0, it branches into one of the post-autodetect modules listed below to take appropriate action.

2.1 Autodetect_IEC61937_Found

/*Here, we have received 4 IEC61937 valid preambles {Pa, Pb, Pc}, the latest set being in Wn-2, Wn-1 and Wn respectively.*/

If (Wn matches the range of Pc acceptable to currently active application) then

{Switch on Header Finder and set IEC61937_Parsing_Enable=1.

Restart Input Unit.

jmp Main_Decode_Loop (Section 3)} else

{If not a repeat, report Unsolicited Message with data word MSB cleared (IEC61937) and copy of Pc datatype in lower 5 bits of parameter.

jmp Autodetect_Initialize (Section 1.1)}

2.2 Autodetect_DTS_LD_Found

/*Here, we have received 6 DTS_LD (16-bit) sync patterns, the latest set being in Wn-1 and Wn, respectively. */

If (the currently active application is DTS) then

{Restart Input Unit.

jmp Main_Decode_Loop (Section 3)}.

else

{If not a repeat, report Unsolicited Message with data word MSB set (non-IEC61937) and DTS_LD indicated with Bits 16:19 =1.

jmp Autodetect_Initialize (Section 1.1).}

2.3 Autodetect_DTS_CD_Found

/* Here, we have received 6 DTS_CD (14-bit) sync patterns, the latest set being in Wn-2, Wn-1 and Wn, respectively. */

If (the currently active application is DTS) then

{Set up input port to ignore MSB and MSB-1 of each input word.

Set BSTART+=2 to ignore the 2 padding sign-extended bits in each 16-bit word.

Restart Input Unit.

Perform 2-bit wide search till we find 0×7ffe 0×8001.

jmp Main_Decode_Loop (Section 3).} else

{If not a repeat, report Unsolicited Message with data word MSB set (non-IEC61937) and DTS_CD indicated with Bits 16:19 =2.

jmp Autodetect_Initialize (Section 1.1)}

2.4 Autodetect_PCM_Found

/* Here, we have received 28670 words (with no 4096-word or more DC sections in them) without finding IEC61937 or DTS sync words */

If (the currently active application is Surround

Effects Code or PCM Mixer) then

{Set BSTOP+=8 to allow full 24-bit PCM to the Input FIFO.

Restart Input Unit.

jmp Main_PCM_Start (Section 4).} else

{Report Unsolicited Message with data word MSB set (non-IEC61937) and Linear PCM indicated with Bits 16:19=3.

jmp Autodetect_Initialize (Section 1.1)}
3.1 Main Decode Loop
3.1.1 if (IEC61937_Parsing_Enable==0) jmp Application_Sync_Search_Start
3.1.2 IEC61937_Sync_Search_Start
Out_Of_Frame_Counter=0; /* Reset the timer mechanism */
Wn-1=Wn=0;
3.1.3 IEC61937_Sync_Search_Loop Wn-1=Wn;
Wait for new data word and store as Wn;
if (Wn==Wn-1)then
{Num_DC_Found++;
If (NUM_DC_FOUND>4096) then
{Num_DC_Found=4096; /*Saturate here till zeroed out by non-DC input*/
Out_Of_Frame_Counter=0;
jmp IEC61937_Sync_Search_Loop}}
else
{Num_DC_Found=0}
if (Wn!=0×f872(Pa))
{If (Out_Of_Frame_Counter>100) then
{jmp Autodetect_Initialize (Section 1.1) /*100 mS Time bomb elapsed */}
else
{jmp IEC61937_Sync_Search Loop}}
Wait for new data word and store as Wn;
if (Wn!=0×4e1f(Pb) ) then
{jmp IEC61937_Sync_Search_Loop}
Wait for new data word and store as Wn;
if (lower 5 bits of Wn==0×0(Null Pc) or lower 5-bits of Wn==0×3(Pause Pc) ) then
{jmp IEC61937_Sync_Search_Loop.
If (lower 5-bits of Wn do not match current application Pc) then
{Report Unsolicited Message with data word MSB cleared (IEC61937) and copy of Pc data type in lower 5 bits of parameter.
jmp Autodetect_Initialize (Section 1.1)}
else
{Wait for new data word and store as Pd for any later use;}
/* Drop down into Application sync search next */
3.1.4 Application_Sync_Search_Start
Out Of Frame Counter=0; /*Reset the timer mechanism */
Wn-1-Wn=0
3.1.5 Application_Sync_Search_Loop
/* NOTE: Strategy changes slightly with each application. For example, multiple words are required only for MPEG and DTS etc. */
/*In DTS, we assume that input hardware is in correct mode (16/14-bit) so that the decoder receives DTS data words transparent to the 16/14-bit format.*/
Wn-2=Wn-1;
Wn-1=Wn;
Wait for new data word and store Wn;
If (Wn==Wn-1) then
{Num_DC_Found++; If (Num_DC_Found>4096) then
{NUM_DC_Found=4096; /*Saturate here till zeroed out by non-DC input*/
Out_Of_Frame_Counter=0;
jmp Application_Sync_Search_Loop}}
else
Num_DC_Found=0;}
if (Wn-2, Wn-1 and Wn do not match the application sync pattern)
{if(Out Of Frame Counter>100)then
{jmp Autodetect_Initialize (Section 1.1) /* 100 mS Time bomb elapsed*/}
else
{jmp Application_Sync_Search_Loop}}
3.1.6 Decode one input frame
/* This step is application dependent and encompasses the complete AC-3/DTS/MPEG decoder implementation. */
3.1.7 jmp Main_Decode_Loop
3.2 Timer Reset Module
/* This module is activated by the timer interrupt every 1 mS. The task here it to simply increment Out_Of_Frame_Counter unconditionally. Since this counter is reset just before opening the time window of its usage, it is harmless and more efficient to unconditionally increment the counter. For the same reason, it is immaterial if Saturation is On or Off for this increment. */
3.2.1 Out_Of_Frame_Counter++
3.2.2 Implement other timer tasks and return from interrupt
4.0 Runtime Autodetect for Linear PCM
4.1 Main_PCM_Start
4.1.1 Main_PCM_Initialize
Initialize the following to zero:
Num_DC_Found
Num_IEC61937_Found, Num_DTS_LD_Found,
Num_DTS_CD_Found,
Num_Samples_IEC61937_Not_Found,
Num_Samples_DTS_LD_Not_Found,
Num_Samples_DTS_CD_Not_Found,
Wn-3, Wn-2, Wn-1, Wn /*4-word data buffer*/
4.1.2 Main_PCM_Loop
Wn-3=Wn-1;
Wn-2=Wn;
Wait for 2 new 16-bit data words and store in Wn-1 and Wn;
/* Thus, Wn-3/Wn-1 correspond to previous/current L channel, and Wn-2/Wn correspond to previous/current R channel input*/
4.1.3 Update Num_DC_Found and branch
If (Wn-2==Wn-1 and Wn-2==Wn) then
{Num_DC_Found++;}
else
{Num_DC_Found=0;}
If (Num_DC_Found>=48000(samples or word-pairs) then
{jmp Autodetect_Initialize (Section 1.1)}
/*48000 samples (not words) or approx. 1000 mS silence defines out-of-PCM state */
4.1.4 Update Num_IEC61937_Found and branch if IEC61937
/* IEC61937 sync pattern can be aligned either at Wn or Wn-1, so search both */
if (Wn-1==0×f872 and Wn==0×4e1f) or (Wn-2==0×f872 and Wn-l==0×4e1f ) then
{Num_Samples_IEC61937_NOT_Found=0;
/*NOTE: No Pc check here since any IEC61937 preamble indicates non-PCM*/
Num_Samples_IEC61937_Not_Found=0;
Num_IEC61937_Found++;

Num__Samples__IEC61937__Not__Found=0;
If (Num__IEC61937__Found>=4) then
{jmp Autodetect__IEC61937__Found (Section 2.1).}
/*NOTE: No harm in deciding here itself that the new stream is IEC61937, since we have found 4 sync patterns.*/}
else
{Num__Samples__IEC61937__Not__Found++;
if (Num__Samples__IEC61937__Not__Found>2048 (samples or word-pairs)) then
{/*Time window elapsed*/ Num__IEC61937__Found= Num Samples IEC61937__Not__Found=0}}

4.1.5 Update Num__DTS__LD__Found and branch if DTS__LD

/* DTS__LD sync pattern can be aligned either at Wn or Wn-1, so search both */
if (Wn-1==0×7ffe and Wn==0×8001) or (Wn-2==0×7ffe and Wn-1==0×8001) then
{Num__Samples__DTS__LD__Not__Found=0;
Num__DTS__LD__Found++;
if (Num__DTS__LD__Found>=6) then
{jmp Autodetect__OTS__LD__Found (Section 2.2)
/*NOTE: No harm in deciding here itself that the new stream is DTS__LD, since we have found 6 sync patterns.*/}}
else
{Num__Samples__DTS__LD__Not__Found++;
If (Num__Samples__DTS__LD__Not__Found>8192 (samples or word-pairs)) then
{/*Time window elapsed*/
Num__DTS__LD__Found=Num__Samples__DTS__LD__Not__Found0;}}

4.1.6. Update Num__DTS__CD__Found and branch if DTS__CD

/*DTS__CD sync pattern can be aligned either at Wn or Wn-1, so search both*/
if (Wn-2==0×1ffff and Wn-1==0×e800 and Wn&0×fc00==0×0400)
or (Wn-3==0×1ffff and Wn-2==0×e800 and Wn&0×fc00==0×0400)
then
{Num__Samples__DTS__CD__Not__Found=0;
Num DTS CD Found++;
if (Num__DTS__CD__Found>=6) then
{jmp Autodetect DTS CD Found (Section 2.3).
/*NOTE: No harm in deciding here itself that the new stream is DTS__CD, since we have found 6 sync pattern.*/}
else
{Num__Samples__DTS__CD__Not__Found ++;
If (Num__Samples__DTS__CD__Not__Found>8192 (samples or word-pairs) then
{/*Time window elapsed*/
Num__DTS__CD__Found=Num__Samples__DTS__CD__Not__Found=0}}

4.1.7 Process one L/R Input sample pair

/*This step is application dependent*/

4.1.8 jmp Main__PCM__Loop

Autodetect Operation: The sequence of events involving autodetection are described below from the host's perspective:

1. The Host downloads decoder 100 with a tentative application code, say AC3, and configures the hardware appropriately.

2. Host then sets up application parameters as desired including enable of the desired application.

3. Host then kickstarts decoder 100 with Autodetect enabled.

4. The autodetect module of the enabled application of the decoder 100 analyzes the input for a maximum of 500 mS of non-silent/non-pause data and determines the content of the input bitstream.

5a. If the enabled application can play the detected input (i.e. if AC3 was detected in this case), then the decoder 100 issues an Unsolicited Message to the host indicating the datatype with Decodable__Bitstream__Flag=1. In our example of AC-3 stream, the message would be 0×870000 0×800001. Decoder 100 then goes ahead and processes it according to the application parameters as setup in Step 1 above.

5b. If the enabled application cannot play the detected input (say Non-IEC61937__LD__DTS was detected), then the decoder issues an Unsolicited Message to the host indicating the datatype with Decodable__Bitstream__Flag=0. In our example, the message would be 0×870000 0×000021.

On receiving this message, host repeats Steps 100 onwards but this time downloads the DTS application code to the decoder 100. Subsequently, DTS will be detected within 500 mS and successfully played by the new DTS code, after sending the corresponding unsolicited message (0×870000 0×8000021).

6. After the above steps and while decoder 100 successfully playing the input bitstream, if the host receives external information that the input has been changed (for instance the user selects a new source using the front panel buttons), then before switching the input data to the decoder 100, the host will send an Application Restart message. This effectively puts decoder 100 in Step 2, without changing any of the hardware configuration or application settings. Then the host repeats Steps 2, 3, 4, 5a/b as described above after enabling the new input stream.

If the new input content is detected as unchanged (still AC3 in our example), decoder 100 responds and continues processing it as in Step 5a. This situation will happen if the new stream selected by the user is also AC3.

If the input contented is detected as different (non-AC3 in our example), decoder 100 responds like in Step 4b and continues monitoring the input stream for change in content.

7. During runtime, while successfully playing the input bitstream, the decoder 100 also simultaneously monitors the input. As soon as it detects a change in the bitstream (no longer AC3, in our original example), the decoder 100 automatically reverts to Step 3, i.e. analyzes the input to determine the content. This is an automatic version of Step 6 above, but is intended to only cover the cases where the host is not aware of any possible upstream content changes. Whenever possible, the host conveys information of possible change in input as in Step 6.

If the input content is detected as different (non-AC3 in our example), decoder 100 reverts to Step 5b.

If the input content is detected as unchanged (still AC3 in our example), decoder continues processing it like in Step 5a, without requiring any further action from the host. This situation could arise due to a pause or track change upstream in the source, like from a player. In the case of compressed data being played currently (like AC3 in our example), there is no unsolicited message to the host in this case, i.e. the host is informed only of changes in bitstream content and pauses/silence are ignored.

In the case of a PCM application that is currently active, if the silence is less than PCM__Autodetect__Silence__

Threshold (default 48000 samples, i.e. 1 Second at 48 kHz) before transitioning to new PCM, decoder 100 continues to process the input data as if no change had occurred.

However, during PCM processing, if the silence is more than PCM_AUTODETECT_SILENCE_THRESHOLD, decoder 100 jumps to an Out-Of-PCM state, and the output is muted (transparent due to silent input anyway). Transition to this Out-Of-PCM state is reported via an Unsolicited Message. Decoder 100 is effectively in Step 4 above now, waiting to autodetect the input once non-silent data appears.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed:

1. A method of automatically detecting a data format type of a stream of data using a plurality of processing loops, the format type selected from a group including a first type including embedded multiple-bit word identifiers and a second type, each loop comprising the steps of:

determining if a first current multiple-bit word and a second multiple-bit word received during a previous loop comprise a set of embedded identifiers associated with the first type of data;

when a set of identifiers associated with the first type of data is detected, determining if a preselected number of detections of the set of identifiers has been reached;

if the preselected number of detections of the set of identifiers has been reached, performing the substeps of:

determining if a current routine being executed is compatible with the first data format;

processing the first type of data with the current routine if the first data and the current routine are compatible;

if the current routine and the first data type are not compatible, retrieving a second routine compatible with the first data type and processing the data of the first data type with the second routine: and if the preselected number of detections has not been reached, testing for the second type of data; and when the stored words are not identifiers of the first type of data, testing for the second type of data.

2. The method of claim 1 wherein said step of testing for a second type of data comprises the substeps of:

determining if the first and second words are a second set of embedded identifiers associated with the second type of data;

when the second set of identifiers is detected, determining if a preselected number of detections of the second set of identifiers has been reached;

if the preselected number of detections has been reached, jumping to a routine for processing the second type of data; and if the preselected number of detections has not been reached testing for a third type of date.

3. The method of claim 1 wherein said step of testing for a second type of data comprises the step of determining whether the data stream comprises a data stream of constants.

4. The method of claim 1 wherein said step of testing for a second type of data comprises the step of determining if the type of data stream is a type of data associated with a second set of embedded identifiers.

5. The method of claim 1 wherein said set of identifiers associated with the first data type is not detected within a predetermined number of processing loops, disregarding all previous detections and clearing a count of detections of the set of identifiers to zero.

6. The method of claim 1 wherein said set of identifiers to be detected includes a plurality of words stored from the current and previous loops.

7. A method of determining a data type of a stream of data in a stream processing device, the data type selected from a group comprising a first type identified by embedded encoded words of information and a second type without embedded encoded words of information, comprising the steps of storing a first word of data in a first buffer and initiating a detection loop;

storing a second word of data in a second buffer, the second word of data being a word stored in the first buffer during a previous loop;

checking the words stored in the first and second buffers for the encoded words identifying a datastream of the first data type;

incrementing a first counter when the words stored in the buffers comprise the encoded words identifying data of the first data type;

incrementing a second counter when the words stored in the buffers do not identify data of the first data type;

when the count in the first counter reaches a predetermined value, performing the substeps of:

determining if a current routine being run is compatible with the first data type, processing the datastream of the first data type with the current routine if the current routine is compatible with the first data type; and when the count in the first counter is below the predetermined value, checking the words of data stored in the first and second buffers for the second type of data; and when the count in the second counter reaches a predetermined value clearing the first counter and checking the first and second buffers for the second type of data.

8. The method of claim 7 and further comprising the steps of:

incrementing a third counter when the words stored in the buffers identify data of the second data type;

incrementing a fourth counter when the words stored in the buffers do not identify words of the second data type when the count in the third counter reaches a predetermined value, jumping to a routine for processing data of the second type;

when the count in the third counter is below the predetermined value, checking for data of a third type; and when the count in the fourth counter reaches a predetermined value clearing the third counter and checking for data of said third type.

9. The method of claim 8 wherein said step of checking for data of the second type comprises the substeps of:

counting the number of occurrences when consecutively input words are equal using a data constants found counter;

when the number of occurrences is greater than a preselected number, determining that a stream of data constants are being received; and when two consecutive input words are not equal, clearing the data constants found counter.

10. The method of claim 7 wherein said step of checking comprises the step of checking for IEC61937 preambles.

11. The method of claim 7 wherein said step of checking comprises the step of checking for DTS___LD (Digital Theater Systems Laser Disc format) sync words.

12. The method of claim 7 wherein said step of checking compromises the step of checking for DTS_CD (Digital Theater Systems Compact Disc format) sync words.

13. A method of processing a data stream comprising the steps of:

determining if selected words in the stream comprise a set of IEC61937 preambles;

if the selected words comprise a set of IEC61937 preambles, checking if an application being run is compatible with a type of associated compressed data identified by the preambles;

if the type of data and the application are compatible, searching for sync words for the type of associated compressed data; and if the sync words are found, decoding a frame of compressed data.

14. The method of claim 13 wherein said step determining comprises the substeps of:

inputting a first word;

determining if the word is the first IEC61937 preamble;

if the word is not the first preamble, determining if a preselected time period, measured in an out-of-frame counter, has expired;

if the time period has not expired inputting a another word;

determining if the word is the first IEC61937 preamble word;

if the word is the first IEC61937 preamble word, inputting another word;

determining if the word is the second IEC61937 preamble word;

if the word is not the second IEC61937 preamble word, reverting to the above step of determining if the word is the first IEC61937 preamble word;

if the word is the second IEC61937 preamble word, inputting another word;

if the word is not the third IEC61937 preamble word, reverting to the above step of determining if the word is the first IEC61937 preamble word;

if the word is the third IEC61937 preamble word, determining if the current application is compatible.

15. The method of claim 13 and further comprising the step of checking for data constants.

16. The method of claim 14 wherein said step of checking for data constants comprises the substeps of:

counting the number of occurrences when consecutively input words are equal using a data constants found counter;

when the number of occurrences is greater than a preselected number, clear the out-of-frame counter to zero; and when two consecutive input words are not equal, clearing the data constants found counter.

17. The method of claim 14 and further comprising the steps of:

determining that the proper sync word has not been found;

determining if the out of frame counter has reached a preselected value;

if the out of frame counter has not reached the preselected value, continue searching for sync words.

18. A method of detecting a change in a data stream from PCM data to data of another format comprising the steps of:

receiving a stream of words;

checking whether the words comprise part of a stream of constants;

checking whether the words comprise part of a stream in a format other than PCM, comprising the substeps of:

checking whether the words include IEC61937 preambles;

if the words do not include IEC61937 preambles, checking whether the words include DTS_LD sync words;

if the words do not include DTS_LD sync words, checking whether the words include DTS_CD sync words; and if the words are in a format other than PCM performing the substeps of:

determining if a currently running processing routine is compatible with the format;

processing the words in accordance with such format with the currently running routine if the currently running routine is compatible with the format;

processing the first and second words as left and right channel PCM data if the words are not constants and are in a PCM format.

19. The method of claim 18 wherein said step of checking whether the words are constants comprises the substeps of:

counting the number of consecutive equal words received; and when the count reaches a preselected value, declaring the data stream a stream of constants.

20. An decoder comprising:

an input for receiving a stream of data, a format type of the data selected from a group comprising a first format type identified by embedded encoded words of information and a second format type without embedded encoded words of information;

circuitry for automatically detecting a presence of said embedded words to determine the format type of said data stream; and circuitry for determining if the format type of the data stream is compatible with a current application being run by said decoder.

21. The decoder of claim 20 wherein said circuitry for automatically detecting is operable to detect said format type of said data stream at startup.

22. The decoder of claim 20 wherein said circuitry for automatically detecting is operable to detect said format type after a change of format type of said data stream during runtime.

23. The decoder of claim 20 wherein said circuitry for detecting is operable to:

determine if the first and second words in said stream comprise a set of embedded identifiers associated with said first type of data;

if the set of identifiers is detected, determine if a preselected number of detections of said set of identifiers has been reached;

if the preselected number of detections has been reached, jump to a routine for processing the first type of data;

if the preselected number of detections has not been reached, test for a second type of data; and when the stored words are not identifiers of the first type of data, test for said second type of data.

24. The decoder of claim 22 wherein said circuitry for processing is operable to:

determine if first and second words of said stream comprise a set of embedded IEC61937 preambles;

if the first and second words comprise a set of embedded IEC61937 preambles, determine if an application being run is compatible with the type of associated compressed data identified by the preambles;

if said type of data and said application are compatible, search for sync words for the associated type of compressed data; and if the sync words are found, decoding a frame of compressed data.

25. The decoder of claim 26 wherein said circuitry for automatically detecting is operable to:

receive said stream of words;

check whether first and second words of said stream comprise part of a stream of constants;

check whether the words comprise part of a stream in a format other than PCM;

if the words are in a format other than PCM, process the words in accordance with such detected format; and processing the first and second words as left and right channel PCM data if the words are not constants and are in a PCM format.

26. The decoder of claim 20 and further comprising a digital signal processor.

27. The decoder of claim 20 and further comprising dual digital signal processors.

28. A digital processing system comprising:

source of a stream of digital data, said stream of data being in a format selected from a group including a first format including embedded identifiers and a second format;

a decoder for receiving and processing said stream in response to an application, said decoder operable to automatically check for said embedded identifiers to identify said format and determine if said format is compatible with a currently running application; and a host processor for downloading said application to said decoder said currently running application is incompatible with said format.

29. The processing system of claim 28 wherein said decoder is operable to send a message to said host when said format and said application are not compatible.

30. The processing system of claim 29 wherein said host is operable to download another application to said decoder in response to said message.

31. The processing system of claim 28 wherein said decoder is operable to detect data in a IEC61937 format.

32. The processing system of claim 28 wherein said decoder is operable to detect data in a compressed data format.

33. The processing system of claim 32 wherein said compressed data format is selected from the group consisting of the DTS_LD and DTS_CD formats.

34. The processing system of claim 29 wherein said processor is operable to automatically detect said format at a start of said stream.

35. The processing system of claim 29 wherein said processor is operable to automatically detect a change in said format during runtime.

36. The processing system of claim 29 wherein said processor is operable to automatically declare a stream to be PCM if it does not detect it to be compressed data or constants for a predetermined number of input words.

37. The processing system of claim 29 wherein said processor is operable to automatically declare a stream to be PCM if it does not detect it to be compressed data or constants for a predetermined period of time.

38. The method of claim 1 and further comprising the substep of generating a message if the current routine is not compatible with the first data format.

39. The method of claim 38 and further comprising the substep of downloading a routine compatible with the first data format in response to the generated message.

40. The method of claim 1 and further comprising the substeps of:

if the current routine and the first data type are not compatible, retrieving a second routine compatible with the first data type; and processing the data of the first data type with the second routine.

41. The method of claim 18 and further comprising the steps of:

if the currently running routine is not compatible with the format, retrieving a second routine compatible with such format; and processing the data with the second routine.

* * * * *

UNITED STATES PATENT AND TRADEMARK OFFICE

CERTIFICATE OF CORRECTION

PATENT NO. : 6,208,223 B1
DATED : March 27, 2001
INVENTOR(S) : Hajime Shimamura et al.

It is certified that error appears in the above-identified patent and that said Letters Patent is hereby corrected as shown below:

Title page,
Please correct the name of the Assignee as follows:

-- [73] OKI ELECTRIC INDUSTRY CO., LTD. Japan --

Signed and Sealed this

Fifth Day of February, 2002

*Attest:*

JAMES E. ROGAN
*Director of the United States Patent and Trademark Office*

*Attesting Officer*